(12) United States Patent
Ramasamy et al.

(10) Patent No.: US 11,515,616 B2
(45) Date of Patent: *Nov. 29, 2022

(54) SYSTEM AND METHOD FOR INTEGRATION OF AN ANTENNA ELEMENT AND FRONT-END MODULE CO-LOCATED INTO A SPEAKER CHAMBER

(71) Applicant: Dell Products, LP, Round Rock, TX (US)

(72) Inventors: Suresh K. Ramasamy, Cedar Park, TX (US); Changsoo Kim, Cedar Park, TX (US); Timothy C. Shaw, Austin, TX (US); Geroncio O. Tan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,882

(22) Filed: Dec. 4, 2020

(65) Prior Publication Data

US 2021/0242564 A1 Aug. 5, 2021

Related U.S. Application Data

(63) Continuation of application No. 16/777,890, filed on Jan. 31, 2020, now Pat. No. 10,862,190.

(51) Int. Cl.
*H01Q 1/22* (2006.01)
*H01Q 13/10* (2006.01)
(Continued)

(52) U.S. Cl.
CPC ........... *H01Q 1/2258* (2013.01); *H01Q 13/10* (2013.01); *H04R 1/023* (2013.01); *H04R 1/025* (2013.01);
(Continued)

(58) Field of Classification Search
CPC ...... H01Q 1/2258; H01Q 13/10; H04R 1/023; H04R 1/025; H04R 1/06; H04R 3/00;
(Continued)

(56) References Cited

U.S. PATENT DOCUMENTS 10,862,190 B1* 12/2020 Ramasamy ............. H04R 1/06
2002/0099891 A1* 7/2002 Cole ..................... G06F 1/1688
710/200

(Continued)

*Primary Examiner* — Andrew L Sniezek
(74) *Attorney, Agent, or Firm* — Prol Intellectual Property Law, PLLC; H. Kenneth Prol

(57) ABSTRACT

An information handling system to wirelessly transmit and receive data may include a base chassis including a metal C-cover and a D-cover, the metal C-cover to house a speaker grill, the speaker grill covering a speaker to emit audio waves; a speaker grill platform antenna formed within the C-cover from a portion of the speaker grill to emit a target radio frequency (RF), including: a slot formed around the portion of the speaker grill to form a peninsula on the speaker grill that is physically separated from the C-cover; a cavity formed behind the peninsula between the C-cover and the D-cover, the cavity including walls formed around the back side of the peninsula to electrically isolate the cavity; a printed circuit board assembly (PCBA) including: an antenna front end circuit operatively coupled to the speaker grill to excite the speaker grill and dynamically switch frequencies based on the target frequency to be emitted by the speaker grill platform antenna; and a contact pin directly coupling an excitation signal to excite the speaker grill platform antenna.

20 Claims, 13 Drawing Sheets

(51) Int. Cl.
 *H04R 3/00* (2006.01)
 *H04R 1/02* (2006.01)
 *H04R 1/06* (2006.01)
 *G06F 1/16* (2006.01)

(52) U.S. Cl.
 CPC ............... *H04R 1/06* (2013.01); *H04R 3/00* (2013.01); *G06F 1/1633* (2013.01); *G06F 1/1656* (2013.01); *H04R 2420/07* (2013.01)

(58) Field of Classification Search
 CPC ............ H04R 2420/07; H04R 2499/15; G06F 1/1633; G06F 1/1656; G06F 1/1688; G06F 1/1698; H05K 9/0081; H05K 9/009
 See application file for complete search history.

(56) References Cited

U.S. PATENT DOCUMENTS

2016/0327986 A1 11/2016 Farahani
2020/0117235 A1 4/2020 McClure

\* cited by examiner

SYSTEM AND METHOD FOR INTEGRATION OF AN ANTENNA ELEMENT AND FRONT-END MODULE CO-LOCATED INTO A SPEAKER CHAMBER

This application is a continuation of prior application Ser. No. 16/777,890, entitled "SYSTEM AND METHOD FOR INTEGRATION OF AN ANTENNA ELEMENT AND FRONT-END MODULE CO-LOCATED INTO A SPEAKER CHAMBER," filed on Jan. 31, 2020, which is assigned to the current assignee hereof and is incorporated herein by reference in its entirety.

FIELD OF THE DISCLOSURE

The present disclosure generally relates to information handling systems, and more particularly relates to an information handling system including an antenna system and front-end module co-located into a speaker chamber.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may also include telecommunication, network communication, and video communication capabilities. The information handling system may also include one or more buses operable to transmit communications between the various hardware components. The information handling system may also include telecommunication, network communication, and video communication capabilities. Information handling system chassis parts may include case portions such as for a laptop information handling system including the C-cover over components designed with a metal structure. The information handling system may be configurable with an antenna system located in a base chassis.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
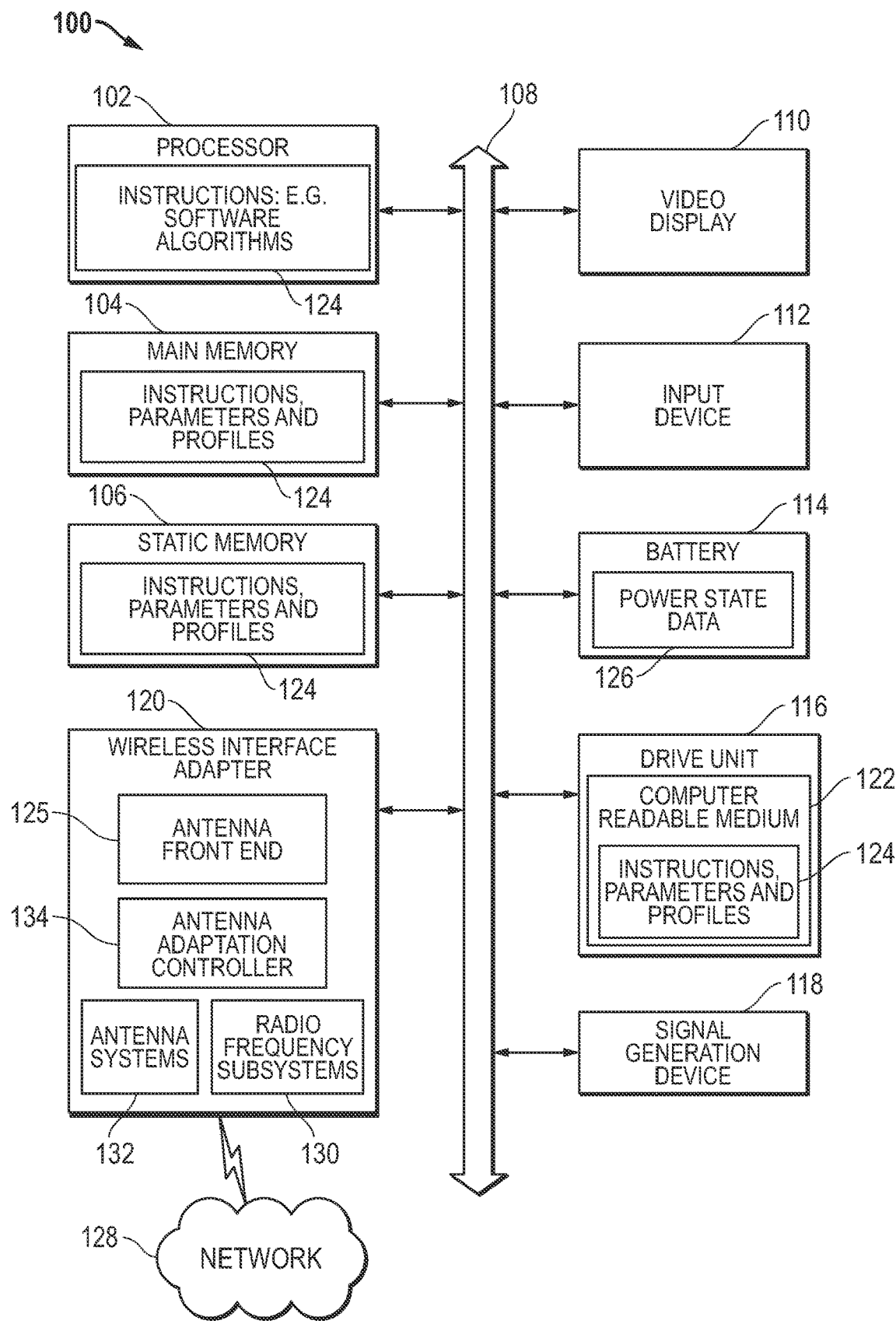
FIG. 1 illustrates an embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts are more commonly designed with a metal structure. In an embodiment, a laptop information handling system, for example, may include a plurality of covers for the interior components of the information handling system. In these embodiments, a form factor case may include an "A-cover" which serves as a back cover for a display housing and a "B-cover" which may serve as the bezel, if any, and a display screen of the convertible laptop information handling system in an embodiment. In a further example, the laptop information handling system case may include a "C-cover" housing a keyboard, touchpad, speaker grill, and any cover in which these components are set and a "D-cover" base housing for the laptop information handling system.

With the need for utility of lighter, thinner, and more streamlined devices, the use of full metal portions for the outer covers of the display and base housing (e.g. the A-cover and the D-cover) is desirable for strength as well as aesthetic reasons. At the same time, the demands for wireless operation also increase. This includes addition of many simultaneously operating radiofrequency (RF) systems, addition of more antennas, and utilization of various antenna types. However, the thinner and more streamlined devices have fewer locations and area available for mounting RF transmitters on these mobile information handling systems. One location within the information handling system where these RF systems and antennas are being deployed to are the C-cover and D-covers. The RF systems and antennas may be pushed out of the A-cover and B-covers, in some examples, due to the increased sizes of displays. In other aspects, a requirement of more antenna may change a location of those additional antennas into the base chassis. This may lead to placing the RF systems and antennas in the C-cover or D-cover of the information handling systems.

Another consequence of using metal covers is the excitation of the metal surfaces of the covers described herein. This excitation of the metal surfaces leads to destructive interference in the signals sent by the antenna systems. This destructive interference may be relatively more detrimental when the RF systems and antennas are emitting signals when the radio frequencies emitted are 5G standard related frequencies that may reach into microwave length frequencies and are, therefore, more susceptible to such interference. Thus, a streamlined, full metal chassis capable of meeting the increasing wireless operation demands is needed.

Some information handling systems would address these competing needs by providing for cutout portions of a metal outer chassis cover filled with plastic behind which RF transmitters/receivers would be mounted. The cutouts to accommodate radio frequency (RF) transmitters/receivers are often located in aesthetically undesirable locations and required additional plastic components to cover the cutout, thus not fully meeting the streamlining needs. The plastic components added a component to be manufactured and were required to be seamlessly integrated into an otherwise smooth metal chassis cover to achieve a level of aesthetics. Further, the plastic portions included may be expensive to machine, and may require intricate multi-step processes for integrating the metal and plastic parts into a single chassis. Incorporation of these plastic portions could require difficult and expensive processes to manufacture with a less aesthetically desirable result. Other options may include the creation of an aperture in the metal display panel chassis and using the metal chassis as a ground plane for excitation of the aperture.

Embodiments of the present disclosure may decrease the complexity and cost of creating chassis for information handling systems by forming the outer chassis (e.g. the A-cover or the D-cover) of metal and implementing a speaker grill that has a portion of its perimeter that has been physically and operatively disassociated from the C-cover. The co-location of the antenna as a metal platform of a portion of the speaker grill and utilizing the speaker cavity therein thereby decreases the need for space elsewhere and thus the size of the information handling system. Additionally, the placement of the antenna front end module, including a tuning module for example, behind the speaker grill at a location by a speaker grill antenna platform provides for additional space elsewhere, such as replacing antenna systems at the B-cover to expand the size of any video display device of the information handling system. Further, the position of the front-end module relative to the speaker grill platform antenna can reduce signal loss or interference due to a shortened antenna feed. This increases the usability of the information handling system.

Additionally, with the advent of different numbers of RF antenna systems such as Wi-Fi and 5G, 4G, NFC, among others causes interference between the myriad of different RF transmissions especially within a metallic chassis housing electronically actuated elements that emit electromagnetics waves either directly or through excitation of the metallic chassis. Embodiments of the present disclosure, therefor, include a printed circuit board assembly (PCBA) or a printed circuit board (PCB) providing a front-end module and antenna feed that is co-located within an acoustic chamber associated with the speaker grill described herein. The present disclosure minimizes the effects to an audio output at a speaker associated with the speaker grill while also minimizing a footprint of the PCBA or PCB within the information handling system and providing improved antenna function and space utilization.

In an embodiment of the present disclosure, the PCBA may be directly coupled to the metallic chassis of the information handling system as the PCBA resides within the acoustic cavity of the speaker grill. This may reduce the electrical line routing to the PCBA (i.e., containing the antenna front end and/or a tuning module) and through the cavity as well as exposure to errant electromagnetic interference (EMI) from those electrical elements within the information handling system and EMI outside of the information handling system.

In an embodiment of the present disclosure, the cavity may have metallic chassis walls formed around the speaker grill in order to form the cavity and electrically isolate the speaker grill, PCBA and other components from the antenna described herein. In an embodiment, metallic chassis walls may be formed on the C-cover and extend down to the D-cover. In an embodiment, the metallic chassis walls may be formed on the D-cover and extend to the C-cover.

In an embodiment, the cavity formed behind the speaker grill may house a speaker used to emit an audio signal as output to a user. The speaker may be operated using an electrical wire that is used to send power and electrical signals to the speaker from a processor. The electrical line may be routed directly out of the cavity through one of the metallic chassis walls described herein and around this e-field region at the high-impedance area to the speaker grill platform antenna. By routing the electrical line from the speaker out of the cavity, the speaker wire may be prevented from overlapping any antenna elements that radiate a radiofrequency (RF) electromagnetic (EM) signal and instead exits the cavity at the lowest impedance location. This prevents interference with those EM field regions within the cavity that emit RF EM signals in either a low-band or high-band frequency. Additionally, with the non-interference of EM signals originating from the speaker grill, the power (i.e., measured in decibels) or field quantity of the signals emitted from the antenna system may be increased.

Manufacture of embodiments of the present disclosure may involve fewer extraneous parts than previous chassis by forming the exterior or outer portions of the information handling system, including the bottom portion of the D-cover and the top portion of the A-cover, from metal. In order to allow for manufacture of fully or nearly fully metallic outer chassis including the A-cover and the D-cover, embodiments of the present disclosure form a form factor case enclosing the information handling system such that one or more transmitting antennas may be formed of the speaker grill integrated into the C-cover of the information handling system. In these embodiments, the footprint within the information handling system that the antenna system consumes may be reduced by forming a single cavity used for audio output by the speaker grill and speaker may also serve as a location where the antenna system is located and RF EM signals may be emitted. A larger speaker cavity may also improve audio output.

The transmitting antennas of embodiments of the present disclosure may include a portion of the speaker grill including an antenna element by forming a slot around a portion of the speaker grill to form the speaker grill platform antenna. In embodiments of the present disclosure, the speaker grill may be excited using an antenna front end co-located within the cavity housing the speaker and formed around the speaker grill. In some embodiments, the antenna front-end may also include a tuning module for establishing the frequency utilized for transceiving wireless signals at designated frequency bands. The excitation of the speaker grill may cause high impedance at the edges of the speaker grill where the slot has been formed around the speaker grill.

Such a method of forming the antenna element as a portion of the speaker grill of the form factor case may exclude the integration of any RF transparent plastic windows within the exterior of the A-cover, B-cover, C-cover, or the D-cover elsewhere, thus decreasing the complexity and cost of manufacture. In other embodiments, a plastic trim ring may be used to visually hide the slot formed around the speaker grill increasing the aesthetic characteristics of the information handling system. The antenna element may then effectively transmit communications signal from the surface of the C-cover.

In embodiments described herein, the antenna element may be excited using a wireless interface adapter that includes an antenna front end. The antenna front end may, in the embodiments presented herein, be operatively coupled to the antenna element to excite the antenna element in order to cause the antenna element to emit one or a plurality of frequencies based on the target frequency or a plurality of target frequencies. Further, a tuning module may be used to determine frequency bands utilized for transceiving wireless signals via the antenna system of the present embodiments. In an embodiment, the speaker grill may be excited to radiate, for example, a low frequency band (700 to 960 Mhz), a mid-frequency band (1.4 G to 2.2 GHz), and a high frequency band (2.3 GHz to 6 GHz) based on location on the speaker grill wherein the antenna signal is applied. In an embodiment, the front-end tuner module may be used to increase the band of frequencies possible at the speaker grill.

In embodiments described herein, the speaker grill may be flush with a surface of the C-cover, which is the surface most likely to interface with human body parts and be visible to the user. In such embodiments, the plastic trim ring may be visually innocuous to the user while preventing objects from passing through the slot formed between the speaker grill and the remainder of the C-cover. Still further, the plastic trim ring may be held within the slot through the use of an undercut formed by the slot and the remaining border of the speaker grill that prevents the plastic trim ring from being removed. Because the plastic trim ring is made of plastic, any RF EM waves may be passed therethrough, during transceiving conducted via the grill platform antenna system operation of the information handling system while still preventing foreign objects from entering the C-cover via the slot formed.

In embodiments described herein, the dimensions of the slot formed around a portion of the speaker grill. In an embodiment, a length of the slot along a single edge of the speaker grill may be between 20 mm and 70 mm. Specific lengths of the slot may allow the speaker grill to emit any frequency or harmonics thereof associated with the emission of RF EM waves as described herein. In any example, presented herein, the width of the slot formed between the speaker grill and the C-cover may be 1.5 mm. In the embodiment, the 1.5 mm width may be sufficient to electrically isolate that portions of the speaker grill platform antenna from the remainder of the C-cover thereby preventing any excitation currents being formed at the C-cover and causing electric noise during RF EM transmission by the speaker grill platform.

Examples are set forth below with respect to particular aspects of an information handling system including case portions such as for a laptop information handling system including the chassis components designed with a fully metal structure and configurable such that the information handling system may operate in any of several usage mode configurations.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications.

Information handling system 100 may represent a mobile information handling system associated with a user or recipient of intended wireless communication. In some embodiments, the information handling system 100 may operate as a mobile information handling system that operates one or more wireless adapters 120. In the embodiments where the information handling system operates a plurality of wireless adapters 120, the wireless adapters 120 may operate to provide for concurrent radio operation in one or more wireless communication bands. The wireless adapter 120 can represent an add-in card, wireless network interface module that is integrated with a main board of the information handling system or integrated, particularly in an antenna/speaker cavity, with another wireless network interface capability, or any combination thereof. In an embodiment the wireless adapter 120 may include one or more RF subsystems 130 including transmitters and wireless controllers such as wireless module subsystems for connecting via a multitude of wireless links under a variety of protocols. In an example embodiment, an information handling system may have an antenna system 132 transmitter for 5G small cell WWAN, Wi-Fi WLAN or WiGig connectivity and one or more additional antenna system transmitters 132 for macro-cellular communication. The RF subsystems 130 include wireless controllers to manage authentication, connectivity, communications, power levels for transmission, buffering, error correction, baseband processing, and other functions of the wireless adapter 120.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 and antenna adaptation controller 134 may connect to any combination of macro-cellular wireless connections including 2G, 2.5G, 3G, 4G, 5G or the like from one or more service providers. Utilization of RF communication bands according to the present disclosure may include bands used with the WLAN standards and WWAN carriers which may operate in both licensed and unlicensed spectrums. For example, both WLAN and WWAN may use the Unlicensed National Information Infrastructure (U-NII) band which may operate in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band, for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless RF communication capabilities as well as licensed wireless RF communication capabilities such as via a subscriber carrier wireless service for example. With the licensed wireless RF communication capability, WWAN RF front end may operate on a licensed WWAN wireless radio with authorization for subscriber access to a wireless service provider on a carrier licensed frequency band.

In some embodiments, the plurality of wireless adapters 120 may further operate in nearby wireless communication bands. Further, the present disclosure contemplates that harmonics, environmental wireless conditions, and other effects may impact wireless link operation when a plurality of wireless links is operating as in some of the presently described embodiments. The series of potential effects on wireless link operation may cause an assessment of the wireless adapters 120 to potentially make antenna system adjustments according to the wireless antenna adaptation control system of the present disclosure.

A mobile information handling system may execute instructions via a processor such as a microcontroller unit (MCU) operating both firmware instructions or hardwired instructions for the antenna adaptation controller 134 to achieve WLAN or WWAN antenna optimization according to embodiments disclosed herein. The application programs operating on the information handling system 100 may communicate or otherwise operate via concurrent wireless links, individual wireless links, or combinations over any available radio access technology (RAT) protocols including WWAN or WLAN protocols such as 5G protocols. These application programs may operate in some example embodiments as software, in whole or in part, on an information handling system while other portions of the software applications may operate on remote server systems. The antenna adaptation controller 134 of the presently disclosed embodiments may operate as firmware or hardwired circuitry or any combination on controllers or processors within the information handling system 100 for interface with components of a wireless interface adapter 120. It is understood that some aspects of the antenna adaptation controller 134 described herein may interface or operate as software or via other controllers associated with the wireless interface adapter 120 or elsewhere within information handling system 100. In an embodiment, the antenna adaptation controller 134 may control an amount of current and voltage to be sent to an antenna element co-located with a speaker grill formed within the C-cover of the information handling system as described herein. The antenna adaptation controller 134 may, in the embodiments presented herein, be operatively coupled to the speaker grill platform antenna element of the speaker grill to excite the antenna element and dynamically switch frequencies based on a target frequency or frequencies to be emitted by the antenna element. In order to switch between frequencies to be emitted from the speaker grill platform antenna element, the antenna adaptation controller 134 may include circuitry used to alter the current and voltage applied to the speaker grill platform antenna element. The antenna adaptation controller 134 may alter the current and voltage in order to alter the ratio of impedance to capacitive reactance at the speaker grill platform antenna element, thereby altering the frequencies emitted by the speaker grill platform antenna element. In an embodiment presented herein, the antenna adaptation controller 134 may form part of the wireless interface adapter 120 along with the antenna front end 125. In the embodiments presented herein, the antenna front end 125 along with a tuning module may form part of a PCBA that is co-located with the speaker grill within a cavity formed behind the speaker grill. As described herein, the PCBA may be directly coupled to the metallic chassis of the information handling system 100 as the PCBA resides within the cavity of the speaker grill. This may reduce the electrical line routing to the PCBA (i.e., containing the antenna front end and/or a tuning module) and through the cavity as well as exposure to errant electromagnetic interference (EMI) from those electrical elements within the information handling system and EMI outside of the information handling system.

Information handling system 100 may also represent a networked server or other system from which some software applications are administered or which wireless communications such as across WLAN or WWAN may be conducted. In other aspects, networked servers or systems may operate the antenna adaptation controller 134 for use with a wireless interface adapter 120 on those devices similar to embodiments for WLAN or WWAN antenna optimization operation according to according to various embodiments. In an embodiment, the networked server may form part of a wireless mesh architecture in some embodiments but not necessarily in all embodiments. In some embodiments, the wireless adapter 120 may connect to the networked server of the external network via a WPAN, WLAN, WWAN, among other wireless connections. Wireless data communication standards may be used that set forth protocols for communications and routing via access points. Other operations performed within the wireless network may include handoff of client devices moving between nodes, self-organizing of routing operations, or self-healing architectures in case of interruption.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid-state display, or a cathode ray tube (CRT). Display 110 may include a touch screen display module and touch screen controller (not shown) for receiving user inputs to the information handling system 100. Touch screen display module may detect touch or proximity to a display screen by detecting capacitance changes in the display screen. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a wearable computing device, or a mobile smart phone.

The information handling system 100 includes an audio system that includes a speaker 118 placed behind the speaker grill. The speaker 118 may be any device the receives a signal from the processor 102 and produces audio as input to the user. This output may be any type of audio including music and notification sounds. As described herein, the speaker 118 may be co-located with the speaker grill in order to decrease the footprint of the speaker 118 and antenna systems 132 consumed within the information handling system 100. In the embodiments presented herein, the antenna systems 132 include the speaker grill platform antenna which is excited by an excitation signal from the antenna front end 125 and causes a signal to be emitted from the speaker grill. Accordingly, the present specification describes the antenna front end 125 being collocated with a speaker system 118 of which is, in some embodiments, co-located in a cavity or speaker chamber under the speaker grill. A speaker feed may be routed around the cavity or isolated chamber to avoid high impedance portions of the speaker grill platform antenna.

The information handling system 100 can include sets of instructions 124 that can be executed to cause the computer system to perform any one or more desired applications. In many aspects, sets of instructions 124 may implement wireless communications via one or more antenna systems 132 available on information handling system 100. In embodiments presented herein, the sets of instructions 124 may implement wireless communications via one or more antenna systems 132 formed as part of a speaker grill formed within a C-cover of a laptop-type information handling system via one or more antenna systems 132 available on information handling system 100. Operation of WLAN and WWAN wireless communications may be enhanced or otherwise improved via WLAN or WWAN antenna operation adjustments via the methods or controller-based functions relating to the antenna adaptation controller 134 disclosed herein. For example, instructions or a controller may execute software or firmware applications or algorithms which utilize one or more wireless links for wireless communications via the wireless interface adapter as well as other aspects or components. The antenna adaptation controller 134 may execute instructions as disclosed herein for monitoring wireless link state information, information handling system configuration data, SAR proximity sensor detection, or other input data to generate channel estimation and determine antenna radiation patterns. In the embodiments presented herein, the antenna adaptation controller 134 may execute instructions as disclosed herein to transmit a communications signal from an antenna system formed as part of a speaker grill platform antenna that is excited to resonant a target frequency around a slot formed around a portion of the speaker grill to form the speaker grill platform antenna in order to transmit an electromagnetic wave at the target frequency or harmonics thereof. The term "antenna element" described herein is meant to be understood as any object that emits a RF (RF) electromagnetic (EM) wave therefrom. The speaker grill platform antenna may form part of a larger antenna system that may include some or all of the elements of the wireless interface adapter 120 as well as additional antennas located on the information handling system. Multiple wireless interface adapters 120 may be used with a plurality of antennas in some embodiments. Additionally, the antenna adaptation controller 134 may prevent noise sourced beyond the speaker grill from creating interference with the determined frequency, or harmonics thereof. The antenna adaptation controller 134 may implement adjustments to wireless antenna systems and resources via a radio frequency integrated circuit (RFIC) front end 125 and WLAN or WWAN radio module systems within the wireless interface device 120. Aspects of the antenna optimization for the antenna adaptation controller 134 may be included as part of an antenna front end 125 in some aspects or may be included with other aspects of the wireless interface device 120 such as 5G, WWAN, or WLAN radio module such as part of the radio frequency (RF) subsystems 130. The antenna adaptation controller 134 described in the present disclosure and operating as firmware or hardware (or in some parts software) may remedy or adjust one or more of a plurality of antenna systems 132 via selecting power adjustments and adjustments to an antenna adaptation network to modify antenna radiation patterns emitted various antennas such as by the speaker grill platform antenna.

Multiple WLAN or WWAN antenna systems that include the speaker grill may operate on various communication frequency bands such as under IEEE 802.11a and IEEE 802.11g (i.e., medium frequency (MF) band, high frequency (HF) band, very high frequency (VHF) band, ultra-high frequency (VHF) band, L band, S band, C band, X band, $K_u$ band, K band, $K_a$ band, V band, W band, and millimeter wave bands providing multiple band options for frequency channels. In some embodiments, the WLAN or WWAN antenna systems may operate as 5G networks that implement relatively higher data transfer wavelengths such as high frequency (HF) band, very high frequency (VHF) band, ultra-high frequency (VHF) band, L band, S band, C band, X band, Ku band, K band, Ka band, V band, W band, and millimeter wave bands. Further antenna radiation patterns and selection of antenna options or power levels may be adapted due physical proximity of other antenna systems, of a user with potential SAR exposure, or improvement of RF channel operation according to received signal strength indicator (RSSI), signal to noise ratio (SNR), bit error rate (BER), modulation and coding scheme index values (MCS), or data throughput indications among other factors. In some aspects, antenna adaptation controller may execute firmware algorithms or hardware to regulate operation of the one or more antenna systems 132 in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used.

Various software modules comprising software application instructions 124 or firmware instructions may be coordinated by an operating system (OS) and via an application programming interface (API). An example operating system may include Windows®, Android®, and other OS types known in the art. Example APIs may include Win 32®, Core Java® API, Android® APIs, or wireless adapter driver API. In a further example, processor 102 may conduct processing of mobile information handling system applications by the information handling system 100 according to the systems and methods disclosed herein which may utilize wireless communications. The computer system 100 may operate as a standalone device or may be connected such as using a network, to other computer systems or peripheral devices. In other aspects, additional processor or control logic may be implemented in graphical processor units (GPUs) or controllers located with radio modules or within a wireless adapter 120 to implement method embodiments of the antenna adaptation controller and antenna optimization according to embodiments herein. Code instructions 124 in firmware, hardware or some combination may be executed to implement operations of the antenna adaptation controller and antenna optimization on control logic or processor systems within the wireless adapter 120 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless adapter 120.

Battery 114 may be operatively coupled to a power management unit that tracks and provides power stat data 126. This power state data 126 may be stored with the instructions, parameters, and profiles 124 to be used with the systems and methods disclosed herein in determining wireless antenna adaptation and antenna optimization in some embodiments.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. With the advent of 5G networks, any number of protocols may be implemented by the network interface device including global system for mobile communications (GSM) protocols, general packet radio service (GPRS) protocols, enhanced data rates for GSM evolution (EDGE) protocols, code-division multiple access (CDMA) protocols, universal mobile telecommunications system (UMTS) protocols, long term evolution (LTE) protocols, long term evolution advanced (LTE-A) protocols, WiMAX, LTE, and LTE Advanced, LTE-LAA, small cell WWAN and IP multimedia core network subsystem (IMS) protocols, for example, and any other communications protocols suitable for the method(s), system(s) and device(s) described herein, including any proprietary protocols. Connectivity by the network interface device may be via wired or wireless connection. Wireless adapter 120 may include one or more RF subsystems 130 with transmitter/receiver circuitry, modem circuitry, one or more unified antenna front end circuits 125, one or more wireless controller circuits such as antenna adaptation controller 134, amplifiers, antenna systems 132 and other radio frequency (RF) subsystem circuitry 130 for wireless communications via multiple radio access technologies. Each RF subsystem 130 may communicate with one or more wireless technology protocols. The RF subsystem 130 may contain individual subscriber identity module (SIM) profiles for each technology service provider and their available protocols for subscriber-based radio access technologies such as cellular LTE communications include small-cell 5G technologies. The wireless adapter 120 may also include antenna systems 132 which may be tunable antenna systems or may include an antenna adaptation network for use with the system and methods disclosed herein to optimize antenna system operation. Additional antenna system adaptation network circuitry (not shown) may also be included with the wireless interface adapter 120 to implement WLAN or WWAN modification measures as described in various embodiments of the present disclosure.

In some aspects of the present disclosure, a wireless adapter 120 may operate two or more wireless links. In a further aspect, the wireless adapter 120 may operate the two or more wireless links with a single, shared communication frequency band such as with the Wi-Fi WLAN operation or 5G LTE standard WWAN operations in an example aspect.

For example, a 5 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. 5G standards may be further defined by the download speeds and the operation under any frequency range 1 (FR1) or frequency range 2 (FR2) frequencies. In the embodiments presented herein, a 5G standard operable by the antenna systems may interface with other 5G technology within the network and may include systems and subsystems that enable beamforming and signal relay processes associated with a 5G architecture. In some embodiments, the shared, wireless communication bands may be transmitted through one or a plurality of antennas. In an embodiment, the shared, wireless communication bands may be transmitted through one or a plurality of antennas co-located with a plurality of speaker grills or enclosure on the information handling system as described herein. Other communication frequency bands are contemplated for use with the embodiments of the present disclosure as well.

The RF subsystems 130 of the wireless adapters may also measure various metrics relating to wireless communication pursuant to operation of an antenna system as in the present disclosure. For example, the wireless controller of a RF subsystem 130 may manage detecting and measuring received signal strength levels, bit error rates, signal to noise ratios, latencies, power delay profile, delay spread, and other metrics relating to signal quality and strength. Such detected and measured aspects of wireless links operating on one or more antenna systems 132, may be used by the antenna adaptation controller to adapt the antenna systems 132 according to an antenna adaptation network according to various embodiments herein. In one embodiment, a wireless controller of a wireless interface adapter 120 may manage one or more RF subsystems 130. The wireless controller also manages transmission power levels which directly affect RF subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a RF subsystem 130, the RF subsystem 130 may control and measure current and voltage power that is directed to operate one or more antenna systems 132.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
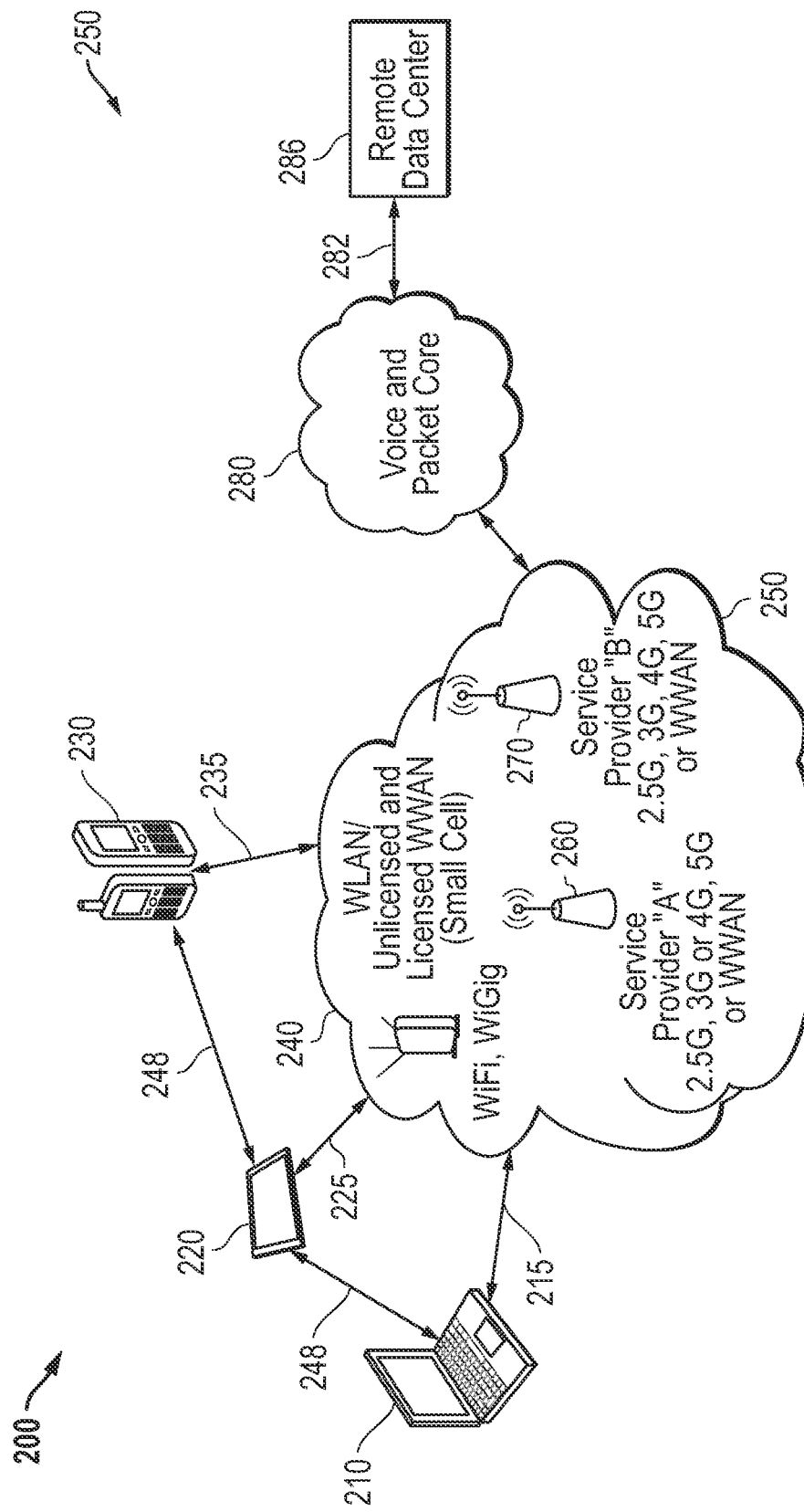
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. In an embodiment, the mobile information handling systems 210, 220, and 230, may access one or more of a metro-cell networks, a micro-cell networks, a pico-cell networks, a femto-cell networks or combinations thereof within a 5G cellular network. In this embodiment, the mobile information handling systems 210, 220, 230 as operated as a 5G cellular network may operate in a sub-6 GHz range or above such as with FR1 (sub-6 GHz) and FR2 (24 GHz-53 GHz) frequency ranges for 5G protocols. Frequency bands available for 5G communications may vary by country or jurisdiction, however, the present description contemplates the use of frequencies in any 5G communication frequency bands regardless of jurisdiction.

WPAN or Wi-Fi Direct Connection 248 and WWAN networks can functionally operate similar to WLANs and components may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11, IEEE 1914/1904, IEEE P2413/1471/42010, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMAXMTS and CDMA 2000, 4G standards, or 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi industrial, scientific and medical (ISM) frequency bands that may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in 5G technology such as with FR1 (sub-6 GHz) and FR2 (24 GHz-53 GHz) frequency ranges for 5G communication protocols. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna may be a transmitting antenna that includes high-band, medium-band, low-band, and unlicensed band transmitting antennas. Alternatively, embodiments may include a single transceiving antennas capable of receiving and transmitting, and/or more than one transceiving antennas. Each of the antennas included in the information handling system 100 in an embodiment may be subject to the FCC regulations related to specific absorption rate (SAR) standards. The antenna in the embodiments described herein is a speaker grill platform antenna intended for efficient use of space within a metal chassis of an information handling system.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 (i.e., a 5G metro-, micro-, pico-, and femto-cell) and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a wireless hotspot in an embodiment. Concurrent wireless links to information handling systems 210, 220, and 230 may be connected via any access points including other mobile information handling systems as illustrated in FIG. 2.

Figure 3A:
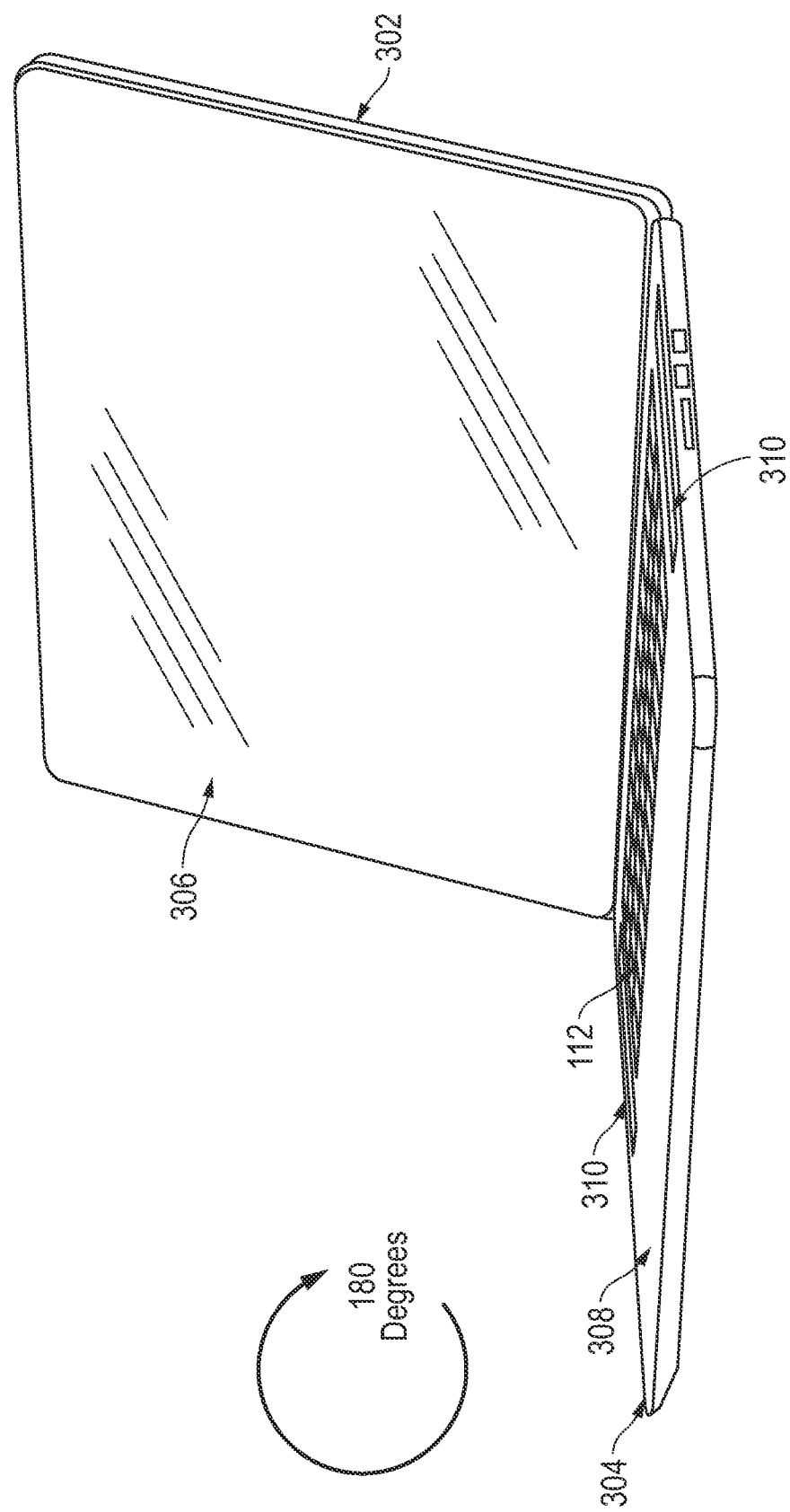
FIG. 3A is a graphical illustration of an information handling system placed in an open configuration according to an embodiment of C-cover including a speaker grill according to an embodiment of the present disclosure.

FIG. 3A is a graphical illustration of a metal chassis including a base chassis and display chassis placed in an open configuration according to an embodiment of the present disclosure. The open configuration is shown for illustration purposes. It is understood that a closed configuration would have the lid chassis fully closed onto the base chassis. The metal chassis 300 in an embodiment may comprise an outer metal case or shell of an information handling system such as a tablet device, laptop, or other mobile information handling system. As shown in FIG. 3A, the metal chassis 300, in an embodiment, may further include a plurality of chassis or cases. For example, the metal chassis 300 may further include an A-cover 302 functioning to enclose a portion of the information handling system. Metal chassis 300 may further include a B-cover 306. In an embodiment, the B-cover 306 may include a bezel with a display formed therein. In some embodiments, the B-cover 306 may include a display device without a bezel. As another example, the metal chassis 300, in an embodiment, may further include a D-cover 304 functioning to enclose another portion of the information handling system along with a C-cover 308 which may include a transmitting/receiving antenna according to the embodiments described herein. The C-cover 308 may include, for example, a keyboard, a trackpad, or other input/output (I/O) device. When placed in the closed configuration, the A-cover 302 forms a top outer protective shell, or a portion of a lid for the information handling system, while the D-cover 304 forms a bottom outer protective shell, or a portion of a base. When in the fully closed configuration, the A-cover 302 and the D-cover 304 would be substantially parallel to one another.

In some embodiments, both the A-cover 302 and the D-cover 304 may be comprised entirely of metal. In some embodiments, the A-cover 302 and D-cover 304 may include both metallic and plastic components. For example, plastic components that are radio-frequency (RF) transparent may be used to form a portion of the C-cover 308 where a speaker grill 310 interfaces with the C-cover 308. According to the embodiments of the present disclosure, the speaker grill 310 may be formed as a part of the C-cover. In these embodiments, the speaker grill 310 may be formed within the C-cover 308 by forming a speaker grill 310 within a side portion of the C-cover 308 as shown in FIG. 3A. In the embodiments described herein, a portion of the speaker grill 310 may be physically separated from the C-cover 308 by forming a slot around a portion of the speaker grill 310 for a speaker grill platform.

As is described herein, the length of the slot around the portion of the speaker grill 310 may be dependent on a target frequency or frequencies to be emitted upon excitation of the speaker grill 310 by a tuning module. In the present specification and in the appended claims, the term "portion" is meant to be understood as a part of a whole. Therefore, in the embodiments disclosed herein, the slot formed around the speaker grill 310 may be less than a total cut-out of the speaker grill 310 from the C-cover 308.

The speaker grill 310 may, therefore, be an integral part of the C-cover 308. In these examples, the speaker grill 310 may also be used to cover or protect a speaker placed below the C-cover 308 and speaker grill 310 in order to provide audio output to a user of the information handling system. The formation of the antenna system that incorporates the speaker grill 310 as the excitation object allows for either the removal of the antenna system from the A-cover 302 and B-cover 306 or a place for added antenna capability. Consequently, the space within the A-cover 302/B-cover 306 assembly where an antenna may have been placed may be eliminated allowing for a relatively larger video display device placed therein in one example embodiment. As a result of placing the antenna element within the C-cover 308 as part of the speaker grill 310, the capabilities of information handling system may be increased while also increasing user satisfaction during use.

In an embodiment, the speaker grill 310 may be formed at any location on the C-cover 308. Therefore, although FIG. 3A shows two speaker grills 310 located to the left and right of a keyboard 112, the present specification contemplates that the speaker grill 310 or speaker grills 310 may be formed along any surface of the C-cover 308. In the embodiments, each of the individual speaker grills 310 may be excited to emit an RF EM wave signal at different frequencies allowing for the ability of the information handling system to communicate on a variety of RATs.

In an embodiment, the A-cover 302 may be movably connected to a back edge of the D-cover 304 via one or more hinges. In this configuration shown in FIG. 3A the hinges allow the A-cover 302 to rotate from and to the D-cover 304 allowing for multiple orientations of the information handling system as described herein. In an embodiment, the information handling system may include a sensor to detect the orientation of the information handling system and activate or deactivate any of a number of antenna systems associated with the speaker grill 310 based on the occurrence of any specific orientation.

Figure 3B:
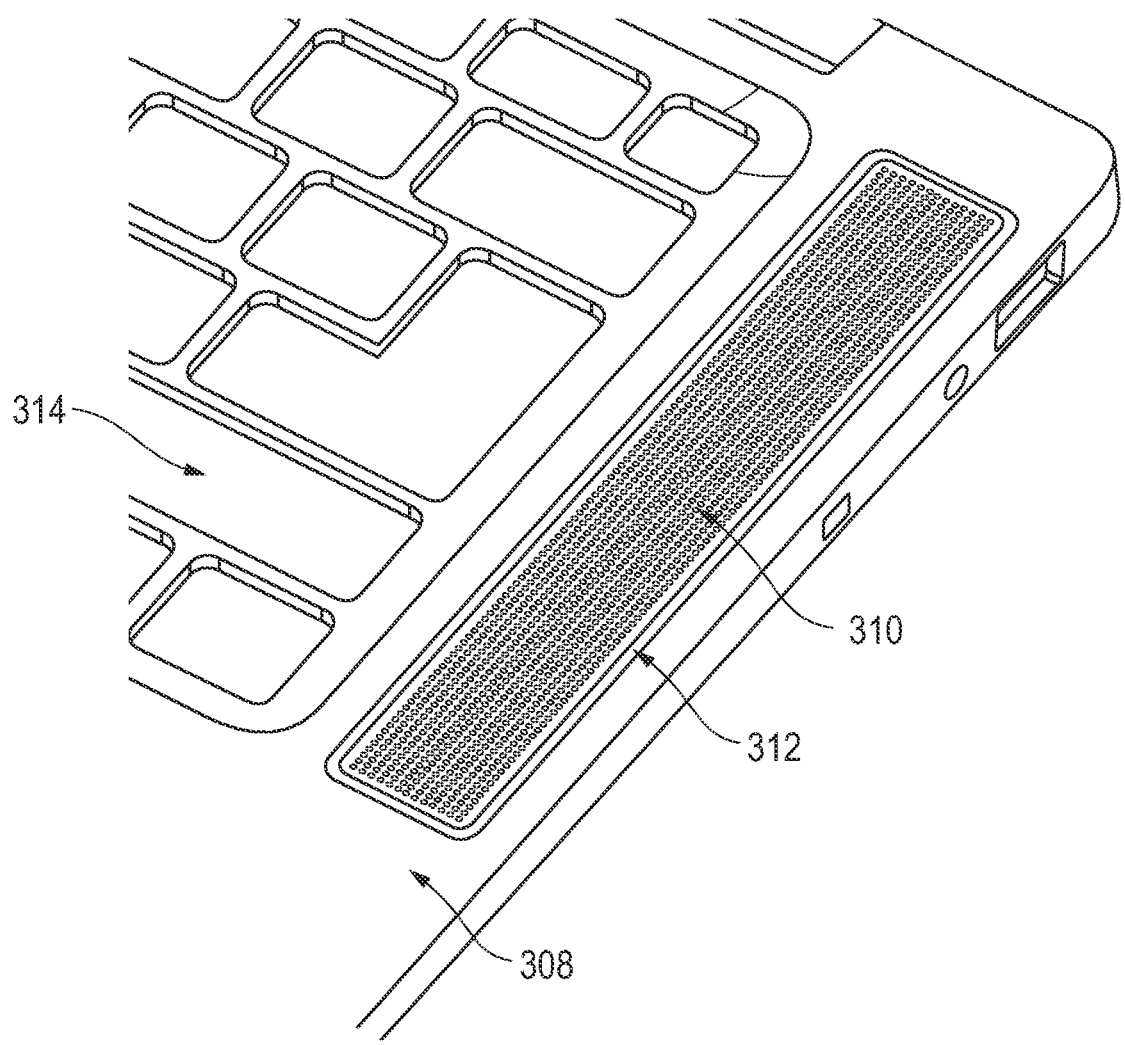
FIG. 3B is a perspective graphical illustration of a C-cover and speaker grill of an information handling system according to an embodiment of the present disclosure.

FIG. 3B is a perspective graphical illustration of a C-cover 308 and speaker grill 310 of an information handling system according to an embodiment of the present disclosure. FIG. 3B shows the C-cover 308 similar to that described in connection with FIG. 3A. The closer perspective view is presented for ease of illustration. The present specification contemplates that, during assembly, the D-cover 304 and keyboard 112 along with other components of the information handling system are to be assembled together with the C-cover 308 and its speaker grill 310.

The C-cover 308 may include a number of vias 314 through which keys of a keyboard may be placed. Additionally, the C-cover 308 may include a speaker grill 310. The speaker grill 310, as described herein, may serve a plurality of functions. A first function may include a physical barrier between the user and a speaker positioned below the speaker grill 310 and C-cover 308. This speaker may receive input from a processor and provide output (i.e., music and notification sounds) to a user during operation of the information handling system. As a physical carrier, the speaker grill 310 may prevent a user from touching and damaging the speaker as well as other delicate elements placed below the C-cover 308. In an embodiment, the speaker grill 310 may include a number of holes through which sound waves from the speaker may pass.

A second function of the speaker grill 310 is to propagate RF EM waves emitted from the antenna and antenna feed contact placed below the speaker grill. In the embodiments described herein, the speaker grill 310 may have a slot formed around a portion of the circumference of the speaker grill 310. The slot may be cut between the speaker grill 310 and the C-cover 308 using any type of manufacturing process including laser ablation, electroforming, anisotropic etching, photolithography, or any other type of precision fabrication processing. As described herein, the slot may be formed along one edge of the speaker grill 310 or along multiple edges of the speaker grill 310. In a specific embodiment, the slot may be formed around a first edge of the speaker grill 310, wrap around to a second edge of the speaker grill 310, and continue onto terminate along a third edge of the speaker grill 310. In this specific embodiment, the slot may make a U-shaped slot around the perimeter of the speaker grill 310 to form a portion of the speaker grill into a speaker grill platform.

In order to prevent physical access by objects or the user below the C-cover 308, the speaker grill 310 includes a plastic trim ring 312 placed within the formed slot. In one embodiment, the plastic trim ring 312 may be placed around a portion of the speaker grill 310. In another example, the plastic trim ring 312 may be placed along an entirety of the perimeter of the speaker grill 310. In either embodiment, the plastic trim ring 312 formed around the speaker grill 310 may be formed to lie flush with the speaker grill 310, the C-cover 308, or both. Placing the plastic trim ring 312 flush with the speaker grill 310, the C-cover 308, or both may render the information handling system aesthetically appealing while also preventing objects from passing through the C-cover 308 via the slot. Still further, because the plastic trim ring 312 is made of a RF transparent material (i.e., plastic), RF EM wave emissions from the antenna element may still be allowed to propagate from the speaker grill 310 without being blocked by an RF non-transparent material. In any embodiment described herein, the color of the plastic trim ring 312 may be chosen to match the color of the C-cover 308 so as to hide the existence of the plastic trim ring 312 thereby increasing the aesthetics of the information handling system.

Although FIG. 3B shows a single speaker grill 310 speaker grill 310 formed into the C-cover 308, the present specification contemplates that any number of speaker grills 310 may be formed into the C-cover 308. In this embodiment, the length and width of the slot formed along the perimeter of the speaker grill 310 may be distinguished from slots associated with other speaker grills 310 so as to alter the band of RF EM waves capable of being emitted from the platform antenna of that specific speaker grill 310. Consequently, the information handling system may include multiple speaker grills 310 capable of transmitting data at multiple RF bands consecutively or concurrently. This increases the communication capabilities of the information handling system such that, in some embodiments, the information handling system can communicate via LTE, WiFi, WiGig, Bluetooth, or other communication protocols based on the frequency band emitted by the individual speaker grill platform antenna formed of portions of the speaker grills. Thus, according to the embodiments presented herein, the antenna systems being incorporated into the speaker grill 310 allows for flexibility in the type of antenna being formed by a portion of the speaker grill 310 thereby increasing the ability for a designer to determine how the information handling system is to communicate with a wireless infrastructure by selecting which RF EM frequency band is going to be used for these communications. Additionally, placement of each of the speaker grills 310 or the speaker grill 310 shown in FIG. 3B may be anywhere on the surface of the C-cover 308 with the slot cut out around a portion of the perimeter of the speaker grill 310 on the C-cover 308. Also, by incorporating the speaker grill platform antenna system with accompanying RF front end electronics described herein behind the speaker grill 310 allows for more compact and streamlined information handling system thereby adding to the aesthetics of the information handling system.

In an embodiment presented herein, the plastic trim ring 312 may be maintained within the slot formed around the speaker grill 310 via an undercut. The undercut may be formed so as to prevent the plastic trim ring 312 from being removed vertically from the slot formed. As described herein, because the slot is not formed completely around the speaker grill 310, a portion of the perimeter of the speaker grill 310 may have a trench formed around the perimeter that does not cut entirely through the C-cover 308 as the slot does. In this embodiment, the trench may also include an undercut that prevents the plastic trim ring 312 from being removed vertically (i.e., perpendicular to the surface of the C-cover 308) from the C-cover 308 thereby exposing the trench and slot as described herein.

Figure 3C:
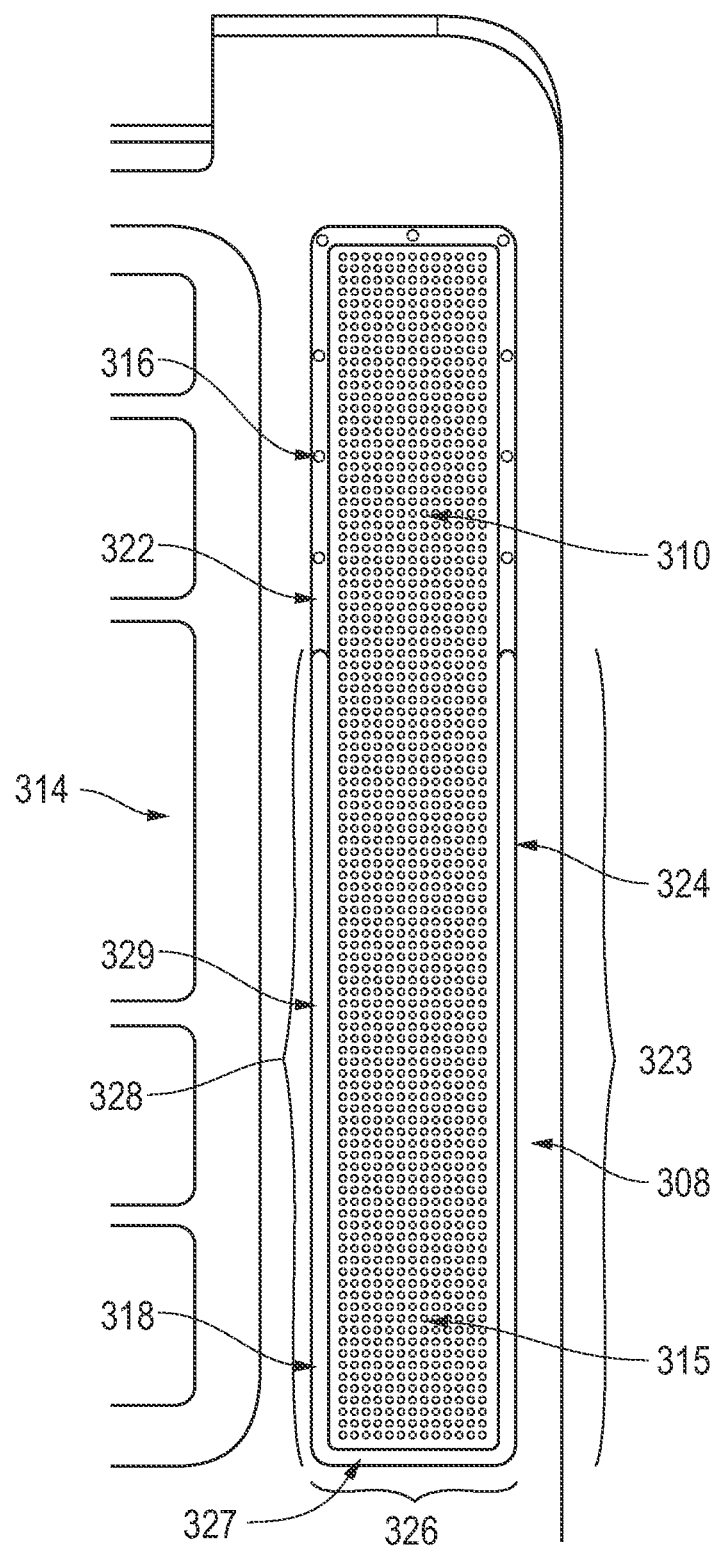
FIG. 3C is another graphical illustration of the C-cover and speaker grill of an information handling system according to an embodiment of the present disclosure.

FIG. 3C is another graphical illustration of the C-cover 308 and speaker grill 310 of an information handling system shown in FIG. 3B according to an embodiment of the present disclosure. As shown in FIG. 3C, the speaker grill 310 has the plastic trim ring 312 removed from the slot 318 and trench 322. A distinguishing characteristic between the slot 318 and the trench 322 is that the slot 318 has been cut entirely through the C-cover 308. Slot 318 around speaker grill 310 may form a speaker grill platform antenna 315 excited by an underside contact point. As described herein, the length of the slot 318 around the speaker grill 310 may be selected to size the speaker grill platform antenna based on the frequency bands to be emitted by the platform antenna 315 when the speaker grill 310 is excited by the tuning module at the underside contact point as described herein. All remaining portions of the perimeter of the speaker grill 310 may have a trench 322 formed around the speaker grill 310.

As described herein, the trench 322 and slot 318 may have an undercut formed therein that prevents the plastic trim ring 312 from being removed. This undercut may, in an embodiment, be formed along an edge of the C-cover 308 where the slot 318 and trench 322 are formed so that a portion of the plastic trim ring 312 may be locked into the trench 322 and slot 318 when placed or formed therein. In an embodiment, the plastic trim ring 312 may be formed into the slot 318 and trench 322 using nano-molding technology (NMT). In this embodiment, the metal of the C-cover 308 may be directly bonded to the plastic trim ring 312 by creating the slot 318 and trench 322 as well as the undercut by, for example, acid etching those structures. The NMT may, once the slot 318, trench 322, and undercut are acid-etched, continue with molding the plastic trim ring 312 into the slot 318 and trench 322 using compression molding, transfer molding, injection molding, or other types of plastic molding processes.

In an embodiment, the trench 322 may include at least one interlocking hole 316. The interlocking hole 316 may be used to secure the trim ring 312 within the trench 322 when the trim ring 312 is coupled to the slot 318 and trench 322. Similar to the undercut formed in the trench 322 and slot 318, the interlocking hole 316 may secure the trim ring 312 within the trench 322 and, in this case, prevent the trim ring 312 form moving laterally within the trench 322 and slot 318. The interlocking hole 316 may, therefore, tightly secure the trim ring 312 within the trench 322 increasing the stability of the plastic trim ring 312 around the speaker grill 310 and maintaining the aesthetic characteristics of the speaker grill 310 of the information handling system.

Similar to FIG. 3B, the C-cover 308 is depicted in FIG. 3C as including a plurality of vias 314. The vias 314 may each receive a key from a keyboard. Thus, although FIG. 3C does not show a keyboard operatively coupled to the C-cover 308, the present specification contemplates that, during assembly, a keyboard may be operatively coupled to the C-cover 308. As described herein, the slot 318 may have a first length 323 along a first edge 324 of the speaker grill 310, a second length 326 along a second edge 327 of the speaker grill 310, and a third length 328 along a third edge 329 of the speaker grill 310. In this embodiment, the slot 318 has been formed around a lower portion of the speaker grill 310 that may serve as the speaker grill platform antenna 315. In an embodiment the first length 323 along a first edge 324 may be 70 mm with matching length on the third edge 329 so that the slot 318 may be tuned to match a specific RF wavelength associated with, for example, a cellular communication protocol as described herein. In other embodiments described herein the first length 323 along a first edge 324 may be 40 mm with matching length on the third edge 329 so that the slot 318 may be tuned to match a specific RF wavelength associated with, for example, a cellular communication protocol as described herein. In any embodiment presented herein, the overall length of the slot 318 (i.e., the accumulated length of the first length 323 of the slot 318, the second length 326 of the slot 318 and the third length 328 of the slot 318) formed at a perimeter of the speaker grill 310 may be created based on the RF EM frequencies to be emitted by the speaker grill 310 and the present specification contemplates other lengths of the slot 318 in order to emit those RF EM waves. During operation of the speaker grill platform antenna system 315, the speaker grill 310 may be excited via excitation of the speaker grill 310 with a current from a front-end module and an antenna feed. The excitation of the speaker grill 310 may cause high impedance at the edges of the speaker grill 310 where the slot 318 has been formed around the speaker grill 310.

Figure 3D:
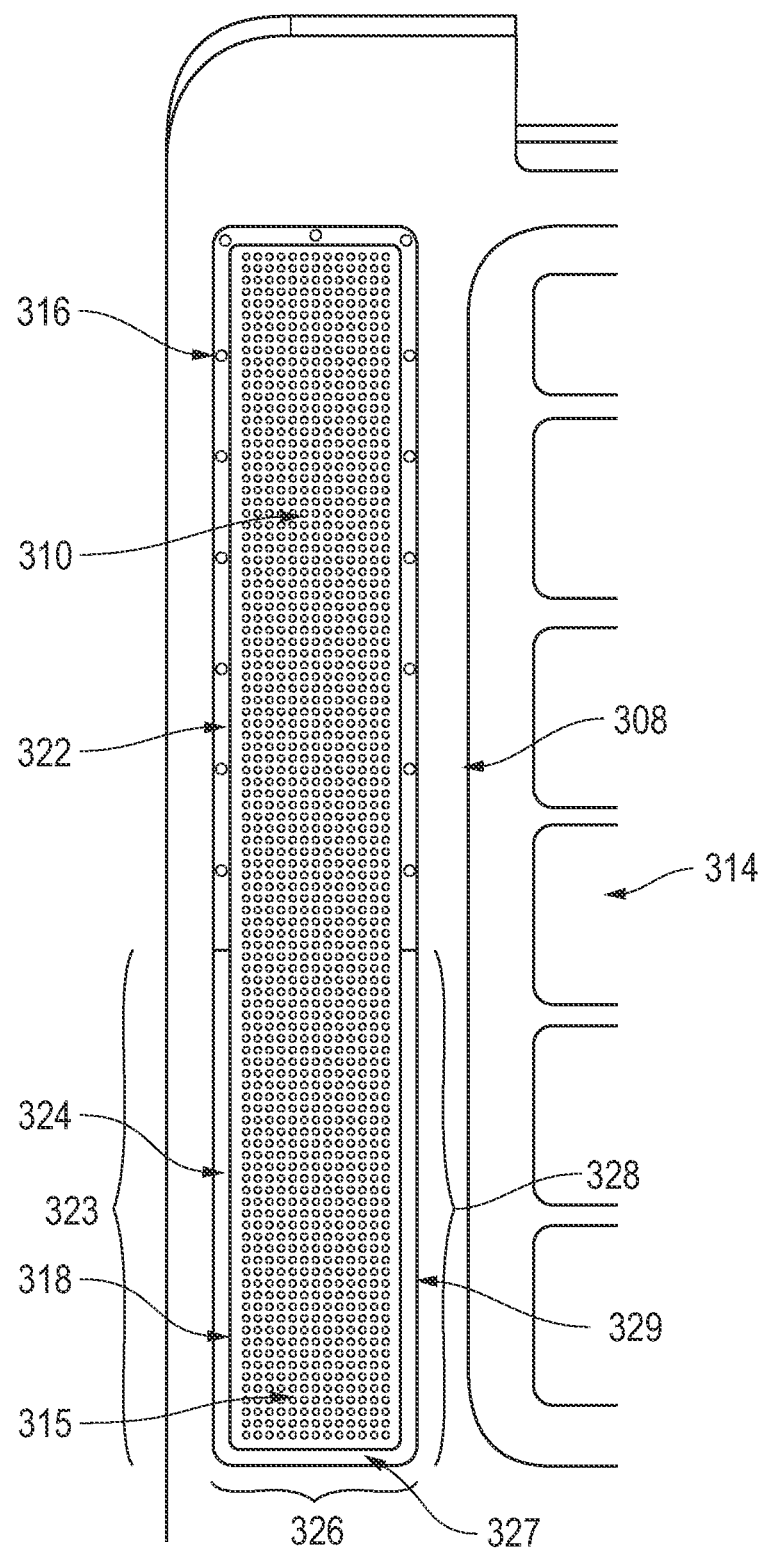
FIG. 3D is a graphical illustration of another speaker grill formed into a C-cover of an information handling system according to an embodiment of the present disclosure.
Figure 3H:
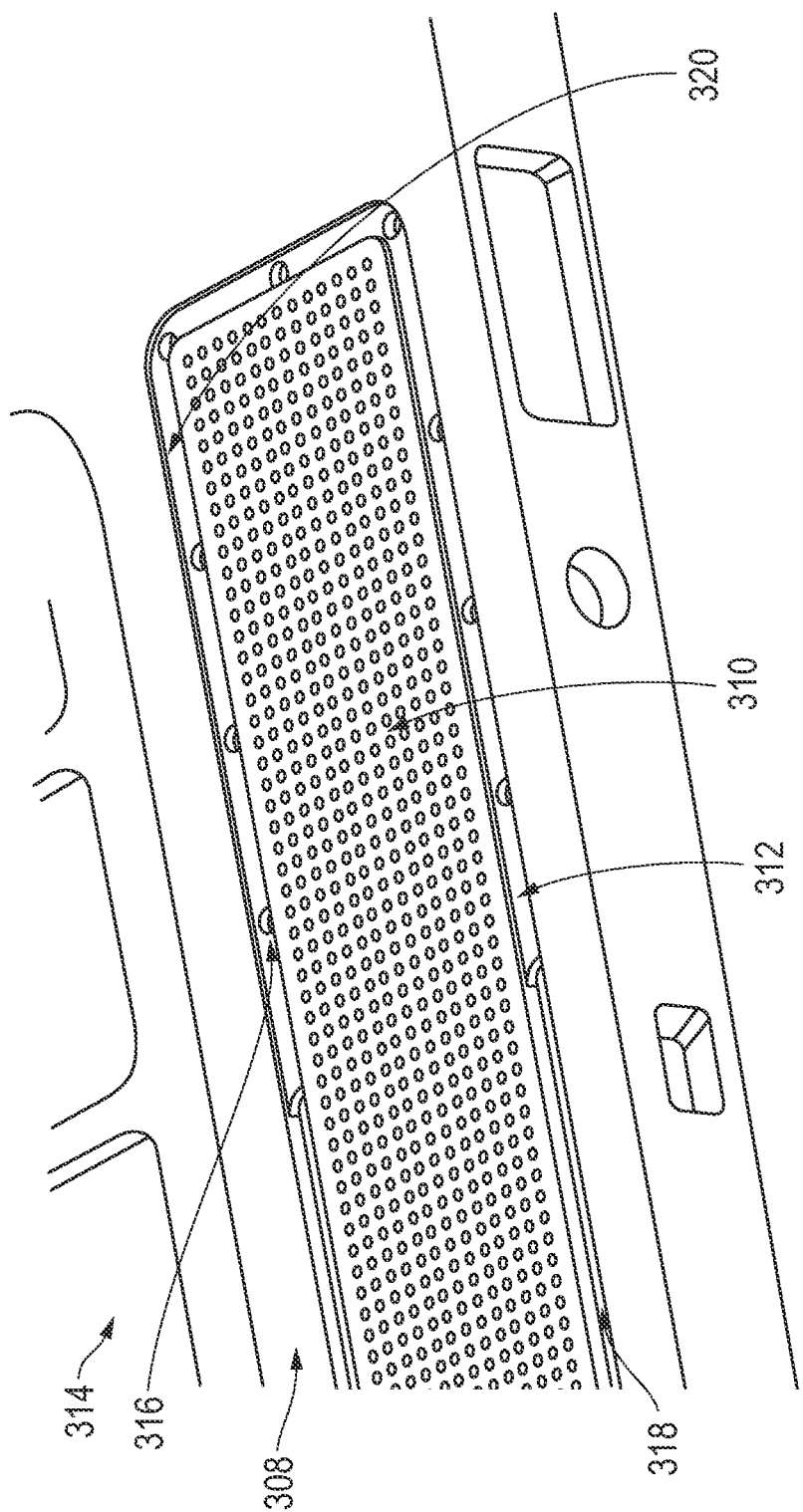
FIG. 3E is a perspective graphical illustration of a speaker grill formed into a C-cover of an information handling system according to another embodiment of the present disclosure.

Additionally, although FIG. 3C shows a speaker grill 310 formed on a right side of the C-cover 308, the present specification contemplates that the speaker grill 310 or an additional speaker grills 310 may be formed on other edges or surfaces of the C-cover 308 such as shown in FIG. 3D. FIG. 3D is a graphical illustration of another speaker grill 310 formed into a C-cover of an information handling system according to an embodiment of the present disclosure. The speaker grill 310 shown in the FIG. 3D may be similar to some aspects of the speaker grill 310 shown in FIG. 3C. In the speaker grill 310 shown in FIG. 3D, a slot 318 may be formed around a partial perimeter of the speaker grill 310 forming the speaker grill platform antenna 315. The slot 318 may terminate at a trench (not shown in FIG. 3D) formed around a remaining portion of the perimeter of the speaker grill 310.

During assembly, a trim ring may be formed into the slot 318 and trench 322 via compression molding, transfer molding, injection molding, or other types of plastic molding processes. The placement of the trim ring into the trench 322 and slot 318 prevents objects from passing through the slot 318 and into the C-cover 308 and D-cover 304 assembly. Additionally, the trim ring may be formed to be level with a surface of the C-cover 308. The trim ring may, therefor, appear to a user to be an accentuating feature of the information handling system while hiding the purpose of the slot 318, trench 322, and speaker grill 310 emissions of RF EM waves. Because the plastic trim ring is RF transparent, the RF EM wave may be propagated away from the information handling system via the speaker grill platform antenna 315.

The trench 322 and slot 318 may also include an undercut formed one or both of the sides of the trench 322 and slot 318. The undercut may prevent the vertical movement out of the trim ring so that the trim ring remains in the slot 318 and trench 322. By securing the trim ring via use of the undercut, the trim ring may not be removed by the user thereby preventing damage to the components of the information handling system if objects were to be passed through the slot 318. FIG. 3D also shows at least one interlocking hole 316 that also prevents the trim ring from moving horizontally within the trench 322. Again, this prevents the removal of the plastic trim ring by the user from the trench 322. During assembly, the plastic of the plastic trim ring may be compressed into the interlocking hole 316 and undercut so that there is a locking fit between the trim ring and the speaker grill 310 and C-cover 308.

FIG. 3D shows a slot 318 that is relatively shorter than the slot shown in FIG. 3C. In an embodiment, the slot 318 may have a first length 323 formed along a first edge 324 of the speaker grill 310, second length 326 formed along a second edge 327 of the speaker grill 310, and third length 328 formed along a third edge 329 of the speaker grill 310. Thus, the slot 318 may be formed around three edges of the speaker grill 310 creating a peninsula of metal of the speaker grill 310 that is the speaker grill platform antenna 315. In an embodiment, the length of the first length 324 is between 20 mm and 40 mm. In any embodiment presented herein, the overall length of the slot 318 (i.e., the accumulated length of the first length 323 of the slot 318, the second length 326 of the slot 318 and the third length 328 of the slot 318) formed at a perimeter of the speaker grill 310 may be created based on the RF EM frequencies to be emitted by the speaker grill 310 and the present specification contemplates other lengths of the slot 318 in order to emit those RF EM waves. During operation of the speaker grill platform antenna system 315, the speaker grill 310 may be excited via excitation of the speaker grill 310 with a current from a front-end module and an antenna feed. The excitation of the speaker grill 310 may cause high impedance at the edges of the speaker grill 310 where the slot 318 has been formed around the speaker grill 310.

In any embodiment described herein including those shown in FIGS. 3C and 3D, the width of the slot 318 may be 1.5 mm. Again, along with the length of the slot 318, the width (e.g., 1.5 mm) of the slot 318 may be selected to be suitably wide so that a specific RF EM wave may be emitted by the speaker grill platform antenna 315 without interference with the metal of the C-cover 308. Thus, the width of the slot 318 may be selected to not only physically separate a portion of the speaker grill 310 from the C-cover 308 but also operatively separate the portion of the speaker grill 310 from the C-cover 308. The portion of the speaker grill 310 may be operatively separated from the C-cover 308 such that the RF EM wave emissions from the edges of the speaker grill platform antenna 315 may propagate without interference from the metal of the C-cover 308. Consequently, in any embodiment presented herein, the width of the slot 318 may be at least wide enough to allow such propagation by the creation of a high inductance at the edges of the peninsula.

FIG. 3E is a perspective graphical illustration of a speaker grill 310 formed into a C-cover 308 of an information handling system according to another embodiment of the present disclosure. FIG. 3E shows further details of the undercut 320 formed into the trench 322. Although FIG. 3E does not show the undercut formed into the slot 318, the present specification contemplates that the undercut 320 is also formed into the slot 318 so as to also retain the trim ring (not shown in FIG. 3E) within that portion of the perimeter of the speaker grill 310.

Also shown in FIG. 3E are the interlocking holes 316 of which, in this example, there are nine. Although FIG. 3E shows nine interlocking holes 316 being formed within the trench 322, the present specification contemplates that there may be more or less than nine interlocking holes 316 and FIG. 3E is merely an example. The interlocking holes 316 may be filled with the plastic used to form the plastic trim ring during an NMT process as described herein. During this process the plastic used to form the trim ring may be pressed into the interlocking holes 316 as well as the undercut 320 and allowed to solidify. After solidification of the plastic, the trim ring is prevented from moving within or out of the slot 318 and trench 322: the undercut 320 preventing vertical movement of the trim ring away from the surface of the C-cover 308 and the interlocking holes 316 preventing movement of the trim ring horizontally. Thus, during use, a user is prevented from removing the trim ring thereby potentially compromising the electrical and mechanical devices placed within the C-cover 308 and D-cover 304 assembly.

The speaker grill 310 may have a number of holes defined therein. These holes may allow sound waves from a speaker to pass through. In an embodiment, the speaker may be placed below the speaker grill 310. In a specific embodiment, the speaker may be placed at a location away from the antenna element. In an embodiment, the speaker is placed below the speaker grill 310 in a location where the speaker grill 310 is coupled to the C-cover 308 and not where the slot 318 has been formed around the speaker grill 310 to form the speaker grill platform antenna 315.

Figure 4A:
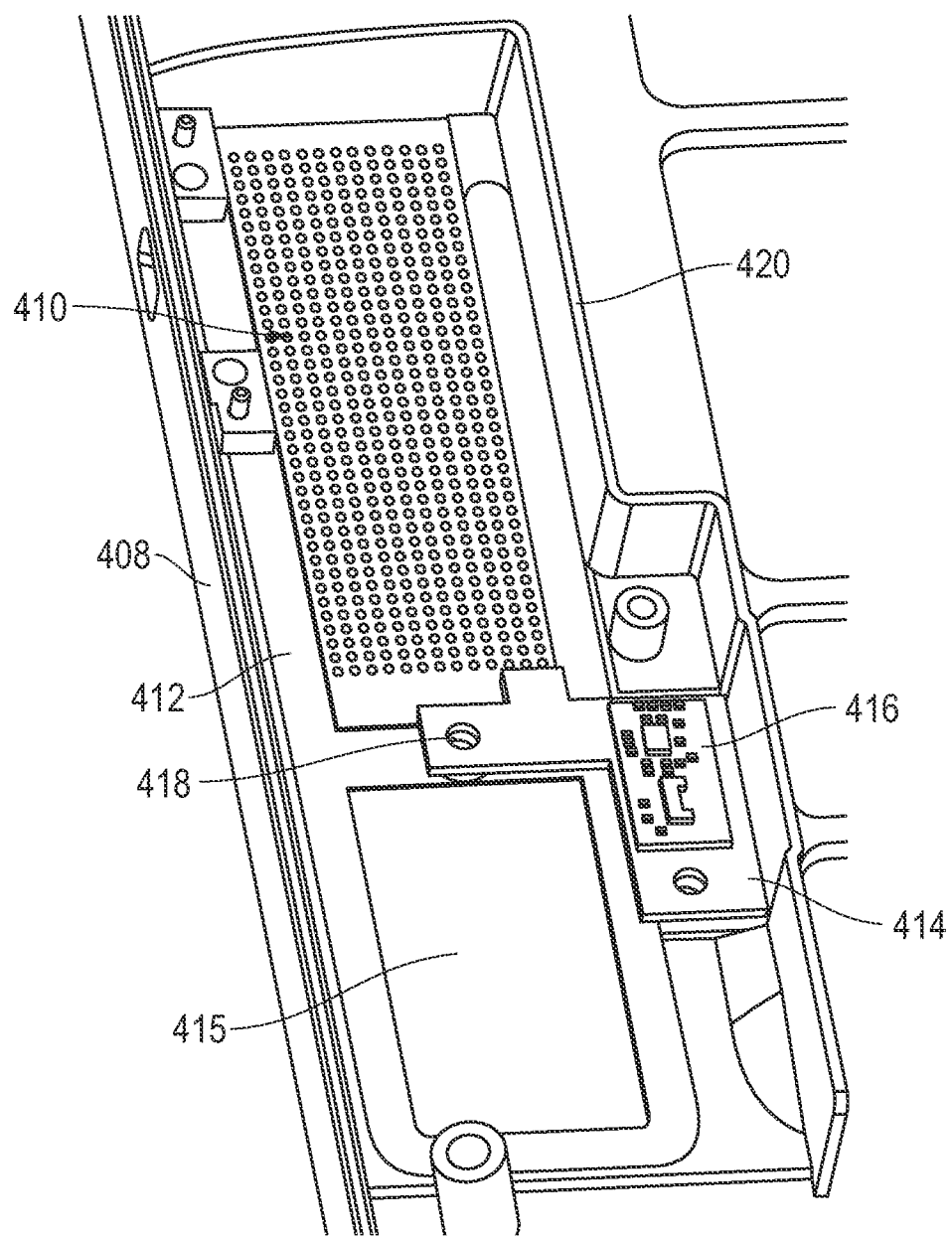
FIG. 4A is a rear-view graphical illustration of a speaker grill and a co-located printed circuit board assembly (PCBA) according to an embodiment of the present disclosure.

FIG. 4A is a rear-view block diagram of a speaker grill 410 and a co-located printed circuit board assembly (PCBA) 414 according to an embodiment of the present disclosure. FIG. 4A shows a rear-view of the speaker grill 410 shown in FIGS. 3C, 3D, and 3E with the plastic trim ring 412 placed within the slot FIG. 3E, 318.

In an embodiment, the PCBA 414 may include an antenna front end module 416. The antenna front end 416 may, in the embodiments presented herein, be operatively coupled to the speaker grill 410 to excite the speaker grill 410 along a speaker grill platform antenna 415 in order to cause the speaker grill 410 to emit one or a plurality of frequencies based on the target frequency or a plurality of target frequencies or harmonics thereof. In the embodiments presented herein, the antenna front end 416 may be communicatively coupled with a tuning module that allows the antenna front end 416 to adjust the current and voltage applied to the speaker grill 410 in order to adjust the frequency to achieve an resonant frequency that the speaker grill platform antenna 415 of the speaker grill 410 can emit.

In an embodiment, the PCBA 414 may be directly coupled to the metallic chassis of the information handling system such as the C-cover 408. In these embodiments, the PCBA 414 resides within a cavity formed around the speaker grill. The cavity is created by lining a boundary of the speaker grill 410 with metallic chassis walls 420. In an embodiment, the metallic chassis walls 420 may be formed on the C-cover 408 and extend down to the interior of the D-cover. In an embodiment, the metallic chassis walls 420 may be formed on the D-cover and extend to the C-cover 408. By placing the PCBA 414 within the cavity, electrical line routing to the PCBA (i.e., containing the antenna front end and/or a tuning module) may be reduced thereby reducing any errant EMI from electrical wiring within the cavity. Additionally, by placing the PCBA 414 within the cavity defined by the metallic chassis walls 420, the cavity and speaker grill 410 are isolated from errant EMI from other electrical lines and elements placed within a remaining portion of the C-cover 408 as well as any other EMI originating from outside the information handling system.

In an embodiment, the PCBA 414 mechanically interfaces with the metallic C-cover 408 and the plastic trim ring 412 to secure the PCBA 414 within the cavity. In an embodiment, the PCBA 414 may be secured to the C-cover 408 using a limited number of brackets so as to limit the number of metallic elements within the cavity. In these embodiments, the PCBA 414 may be secured to a portion of the plastic trim ring 412 that traverses the peninsula formed by the slot as described herein. In an embodiment, the traversing portion of the plastic trim ring 412 may be secured to the speaker grill 410 via the undercut described herein. In the embodiments presented herein, the PCBA 414 may include a threaded hole or screw boss that receives a screw or other similar fastening device. In this embodiment, the screw boss may be aligned with a hole 418 defined in the PCBA 414 so as to pass the fastening device through the hole 418 and secure the PCBA 414 to the screw boss. By implementing the screw boss within the plastic trim ring 412, the number of metallic elements within the cavity is reduced while also placing any metallic elements (i.e., the screw and PCBA 414) away from the RF EM radiating speaker grill 410. In another aspect, a non-metallic fastening device may be used through hole 418. This prevents disruption in signal propagation from the speaker grill 410 as the antenna front end module 416 and tuning module excites the speaker grill 410 during operations of the antenna system.

In a separate embodiment, the PCBA 414 may be bonded to the plastic trim ring 412 using a thermoplastic staking process also known as a heat staking process. The thermoplastic staking process uses heat to deform a plastic stud protruding from one component and passing through a hole defined in another component. In this embodiment, the portion of the plastic trim ring 412 that traverses the speaker grill 410 may include such a stud that interfaces with a hole defined in a portion of the PCBA 414. By using a plastic interface between the plastic trim ring 412 and the PCBA 414, any potential interference may be reduced relative to a use of a metallic connecting pieces between the speaker grill 410 and the PCBA 414.

Figure 4B:
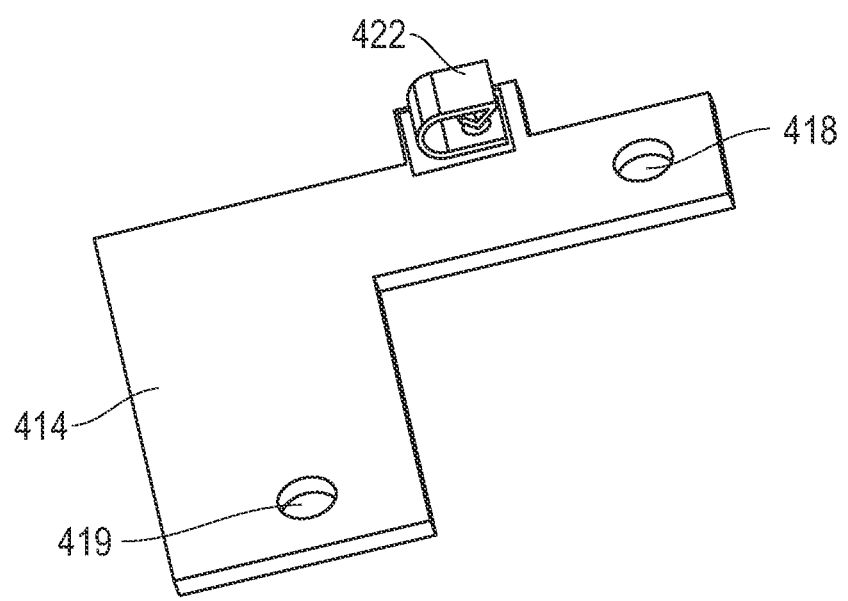
FIG. 4B is a rear-view graphical illustration of a co-located PCBA according to an embodiment of the present disclosure.

In the embodiments presented herein, the PCBA 414 may include a contact pin (not shown in FIG. 4A) that electrically couples the antenna front end module 416 to the speaker grill 410. In this way, the PCBA 414 may be operatively coupled to a portion of speaker grill 410 to form a speaker grill platform antenna 415 of the present embodiments. FIG. 4B is a rear-view block diagram of the co-located PCBA 414 of FIG. 4A according to an embodiment of the present disclosure showing such a contact pin 422. FIG. 4B shows the opposite side of the PCBA 414 than that shown in FIG. 4A.

In the embodiment shown in FIG. 4B, the contact pin 422 may be located on an arm of the PCBA 414 so that the antenna front end module 416 may be electrically coupled to the contact pin 422 but remain a distance away from the radiating speaker grill 410. An antenna feed trace may be printed into the PCBA 414 to connect the antenna front-end circuitry to the contact pin 422 via the arm of the PCBA 414. In an embodiment, the antenna feed may be on the underside of the PCBA 414. The contact pin 422, in an embodiment, may include a spring or other biasing device that prevents electrical decoupling of the contact pin 422 from the speaker grill 410. Although, as shown in the embodiment of FIG. 4A, the PCBA 414 may be secured to the C-cover 408 chassis and plastic trim ring 412 via contact points of 418 and 419 in an embodiment. These connection points may maintain the PCBA 414 within the cavity and assist in maintaining the contact pin 422 against the speaker grill 410. As such, even if the information handling system were to be bumped and the PCBA 414 were to separate a distance away from the C-cover 408 chassis and plastic trim ring 412, the spring loaded or biased contact pin 422 will maintain contact with the speaker grill 410 so that excitation of the speaker grill 410 may be maintained by the antenna front end module 416.

Although FIGS. 4A and 4B shows a specific form of the PCBA 414 having a body portion having antenna front end module 416 circuitry on it, an antenna feed line, and an arm to which the contact pin 422 is coupled, other form factors are contemplated in the present specification. In the embodiments presented herein, the PCBA 414 may include any form factor that limits the electrical interference from the antenna front end module 416, tuning module, or other circuitry placed on the body of the PCBA 414 while still allowing the contact pin 422 at the arm to maintain contact with the speaker grill 410. In any orientation or form, the present antenna system utilizes a PCBA 414 interface to create an antenna subassembly that incorporates a surface contact feature such as the contact pin 422 directly on the antenna front end module 416 so that the surface contact feature interfaces with the semi-floating, co-located metallic chassis resonator such as the speaker grill platform antenna 415.

By including the PCBA 414 with its antenna front end module 416, tuning module, antenna feed, and contact pin 422 with the speaker and radiating speaker grill 410 allows for a relatively compact antenna system and audio system within the information handling system. As such the footprint within the information handling system may be reduced allowing for additional room for electrical and mechanical devices to be placed within the information handling system. By way of a specific example, the antenna system may be located within the C-cover 408 instead of within the B-cover in an embodiment. This allows for a larger video display which increases the usability of the information handling system and user satisfaction realized by the user. Also, by placing the antenna front end module 416 on the PCBA 414 within the cavity, the antenna system may realize a minimal loss in signal transmission performance. This is due to a relatively shorter antenna feed and a shielded antenna feed inside the cavity.

In an embodiment, the antenna front end module 416 and tuning module may be communicatively coupled to, for example a processor associated with the wireless adapter interface, via a co-axial cable. The co-axial cable feed from the processor is connected directly to the antenna front end module 416 and its tuning module which, in turn, utilizes the PCBA 414 to connect to ground. In this embodiment, the co-axial cable is passed through the metallic chassis walls 420 at the location of the PCBA 414 so as to create the least amount of interference with the radiating speaker grill 410. In this way, some portion of the wireless adapter may also be located outside of the cavity in some embodiments.

Figure 4C:
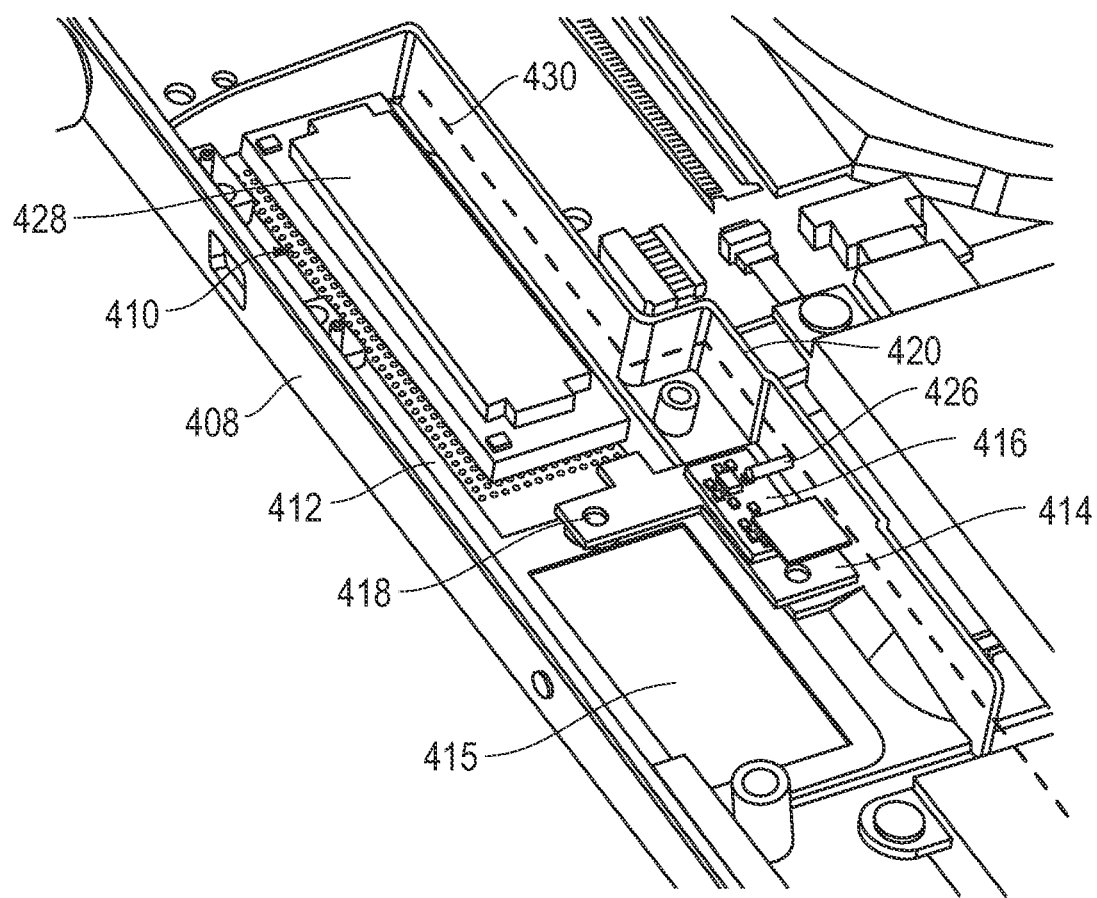
FIG. 4C is a rear-view graphical illustration of a speaker grill with a speaker and speaker wire according to an embodiment of the present disclosure.

FIG. 4C is a rear view, graphic diagram of a speaker grill 410 with a speaker 428 and speaker wire 430 according to an embodiment of the present disclosure. As shown, the speaker grill 410 is communicatively and electrically coupled to the PCBA 414 via the contact pin as described herein to operatively couple a front-end circuitry 416 to the speaker grill platform antenna 415. Additionally, the PCBA 414 is communicatively and electrically coupled to a processor associated with the wireless adapter interface via a co-axial cable 426 that passes through a portion of the metallic chassis walls 420 at or around the location of the PCBA 414.

In an example presented herein, the cavity formed by the metallic chassis walls 420 includes a speaker 428 used to produce output in the form of audio to a user. In an embodiment, the speaker 428 may be any device that produces audio as output to a user and may include some or all of amplifiers, magnets, diaphragms, and coils used to produce this audio at the speaker 428. Other components of the speaker 428 may be included and the present specification contemplates the use of these additional or alternative elements of the speaker 428.

As described herein, the speaker 428 may be powered and receive input signals via a speaker wire 430 shown as a dotted line to indicate routing around metallic chassis wall 420 of the speaker and antenna cavity. In the embodiments presented herein, the speaker wire 430 may be routed out of the cavity so as to prevent it from overlapping any antenna elements of the speaker grill platform antenna 415. In the example presented in FIG. 4C, the speaker wire 430 is routed out of the cavity at a location furthest away from the speaker grill platform antenna 415. Once the speaker wire 430 is routed out of the cavity, the speaker wire 430 may be routed anywhere within a remaining portion of the information handling system due to the speaker wire 430 not effecting the transmission of the radiating speaker grill platform antenna 415 when outside of the cavity defined by the metallic chassis walls 420. As a result, the speaker wire 430 may be prevented from acting as a parasitic element within the cavity thereby increasing the power (i.e., measured in decibels) or field quantity of the signals emitted from the speaker grill platform antenna 415.

In an embodiment, the speaker 428 may be oriented within the cavity so as to be placed behind a portion of the speaker grill 410 that is not part of the peninsula that is the speaker grill platform antenna 415 formed by the slot. In this example, the impact of the speaker 428 may be limited on the speaker grill platform antenna 415 by placing the speaker 428 in a location where the speaker grill platform antenna 415 is not radiating.

Figure 4D:
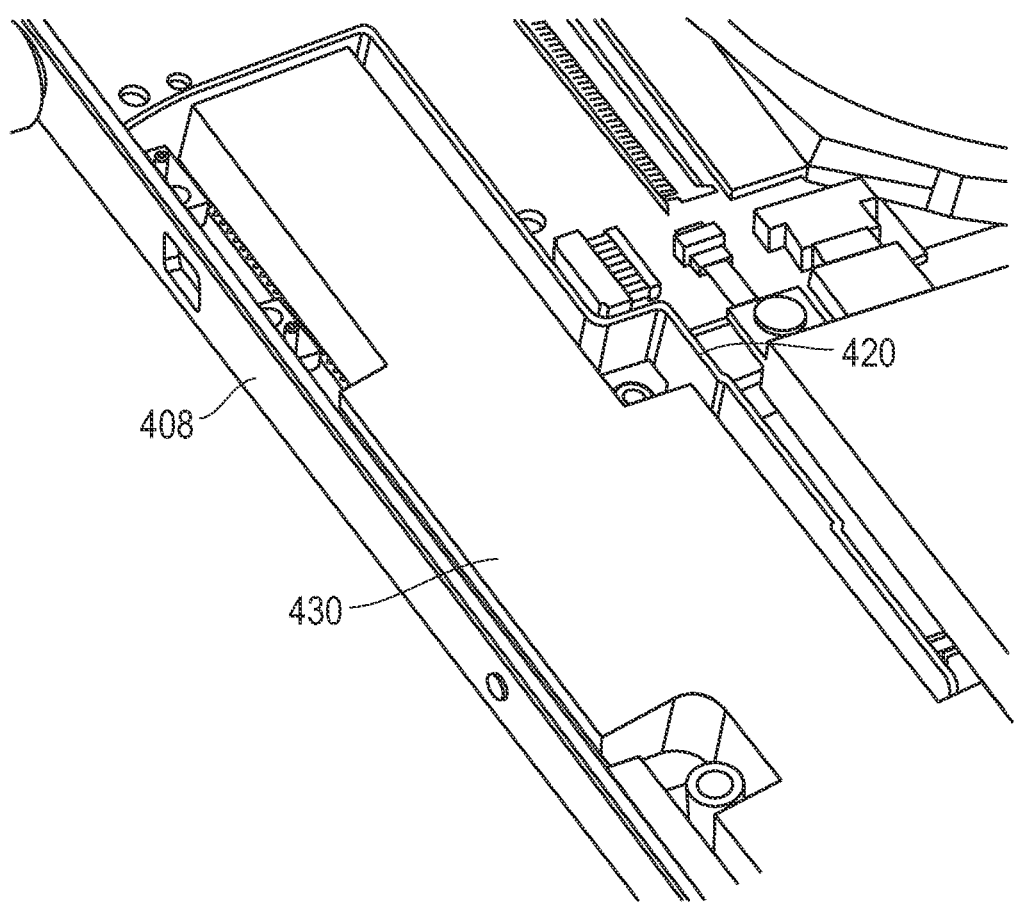
FIG. 4D is a rear-view graphical illustration of a speaker grill with a speaker according to an embodiment of the present disclosure.

FIG. 4D is a rear-view, block diagram of a speaker grill 410 with a speaker 428 and according to an embodiment of the present disclosure. As described herein, the cavity formed by the formation of the metallic chassis walls 420 may serve two functions. A first function includes a cavity to isolate the speaker grill platform antenna 415, antenna feed, front-end circuitry, and other components of the antenna system from EMI originating from within a remaining portion of the base chassis under the C-cover 408 or outside of the information handling system. This first function of the cavity increases the power (i.e., measured in decibels) or field quantity of the signals emitted by the speaker grill platform antenna 415 when excited.

As a second function, the cavity may act as an audio cavity that boosts audio qualities of the output from the speaker 428. In a specific example, the cavity may be formed by the C-cover 408, the metallic chassis walls 420, and, when assembled thereto, the D-cover of the information handling system. In this embodiment, the audio characteristics of the audio output from the speaker 428 may be enhanced due to the volume of air present within the cavity and the speaker 428 may be selected based on the total anticipated volume within the cavity during manufacture of the information handling system.

In another embodiment, the cavity may include an audio cavity 430 that establishes or otherwise determines the internal volume of the cavity relative to the speaker 428 and its audio output. This audio cavity 430 may fit within or fill the cavity formed by the C-cover 408, metallic chassis walls 420, and D-cover. The audio cavity 430 may allow a manufacturer to select specific types of speakers 428 to place within the cavity and allow the design to be altered or enhanced with regard to the audio output of the speaker 428 by customizing the volume within the cavity for the audio output to pass out of the speaker grill 410. In an example, the function of the audio cavity 430 may be to prevent sound waves generated by a rearward-facing surface of, for example, a diaphragm of an open speaker driver interacting with sound waves generated at the front of the speaker driver. Because the forward- and rearward-generated sounds are out of phase with each other, any interaction between the two in the listening space creates a distortion of the original signal as it was intended to be reproduced. The audio cavity 430 may, therefore, be customized with any used speaker 428 to increase sound quality. In an embodiment, the audio cavity 430 may be made of a plastic and, this audio cavity 430 may be RF transparent so as not to impact RF transmissions or receptions at the speaker grill platform antenna 415. In an embodiment, the volume of the audio cavity 430 may be equal to or less than the volume of the cavity formed by the C-cover 408, metallic chassis walls 420, and D-cover.

The presently described antenna system that introduces an interface PCBA 414 within a cavity to provide co-location of an antenna front end module 416 into the acoustic chamber or audio cavity within minimum footprint impacts within the information handling system and disruptions in RF performance of the radiating speaker grill platform antenna 415. The present antenna system utilizes a PCBA 414 interface to create an antenna subassembly that incorporates a surface contact feature such as the contact pin 422 directly on the antenna front end module 416 so that the surface contact feature interfaces with the semi-floating, co-located metallic chassis resonator such as the speaker grill 410. In an embodiment, the PCBA 414 may be secured to the C-cover 408 using a limited number of brackets via, for example, the plastic trim ring 412 so as to limit the number of metallic elements within the cavity and decrease the parasitic elements within the cavity and near the resonating speaker grill platform antenna 415.

The described antenna system also includes an orientation of the speaker wire 430 that includes the exit of the speaker wire 430 from the cavity at a lower impendence region within the cavity. This layout of the speaker wire 430 prevents additional parasitic elements crossing the radiating speaker grill 410. These features minimize distortion and interference while providing for enhanced speaker and speaker grill platform antenna 415 operation.

Figure 5:
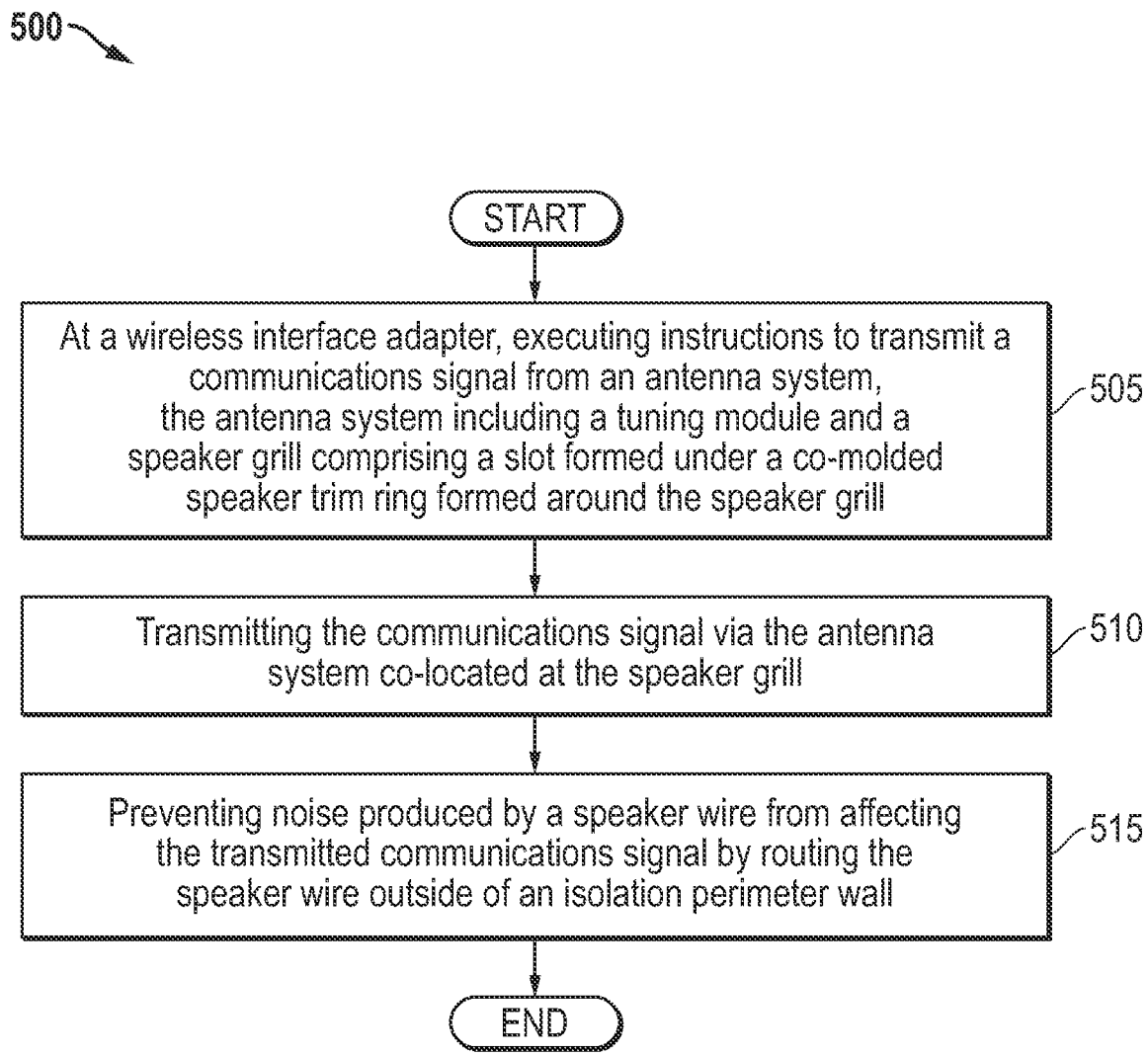
FIG. 5 is a flow diagram illustrating a method for operating an information handling system according to an embodiment of the present disclosure.

FIG. 5 is a flow diagram illustrating a method 500 for operating an information handling system according to an embodiment of the present disclosure. The method 500 may include, at a wireless interface adapter, executing, at block 505, instructions to transmit a communications signal from an antenna system. In the embodiments presented herein, the antenna system includes a tuning module and a speaker grill platform antenna comprising a slot formed under a co-molded speaker trim ring formed around a speaker grill. As described herein, the antenna system also includes a PCBA co-located with the speaker grill and placed within a cavity to shield the PCBA front end, antenna feed, and contact points. The PCBA, in an embodiment, may be coupled to a section of the plastic trim ring so as to prevent the introduction of more interfering elements into the cavity thereby improving the transmission power of the speaker grill platform antenna 415 during operation.

In an embodiment, the PCBA may receive signals and power from a processor associated with the wireless adapter interface via a co-axial cable entering the cavity close to the PCBA and away from a radiating portion of the speaker grill. This also reduces the introduction of more parasitic elements into the cavity thereby improving the transmission power of the speaker grill during operation.

In order to excite the radiating portion of the speaker grill platform antenna, the PCBA may include an arm with an antenna feed trace formed in the PCBA to which a contact pin is coupled. By operation of the antenna front end module which includes a tuning module, the contact pin 422 may provide the excitation currents to the speaker grill via the shortened antenna feed.

The method 500 may continue, at block 510, with transmitting the communications signal via the antenna system co-located at the speaker grill. In an embodiment, the resonant frequency created by the speaker grill be selected based on the length of the slot formed around the speaker grill and dimension of the speaker grill platform antenna. During operation, a processor associated with the wireless adapter interface may send electrical signals to the PCBA via the coaxial cable in order to excite the speaker grill platform antenna via the contact pin as described herein.

The method 500 may also include, at block 515, preventing noise produced by a speaker wire from affecting the transmitted communications signal by routing the speaker wire outside of an isolation perimeter wall and outside of the cavity. In an embodiment, a transducer of a speaker within the cavity may be placed at a location away from the speaker grill to also prevent any interference with the excitation of the speaker grill. The speaker wire may operatively connect the speaker to an audio driver to drive audio via the speaker grill.

Figure 6:
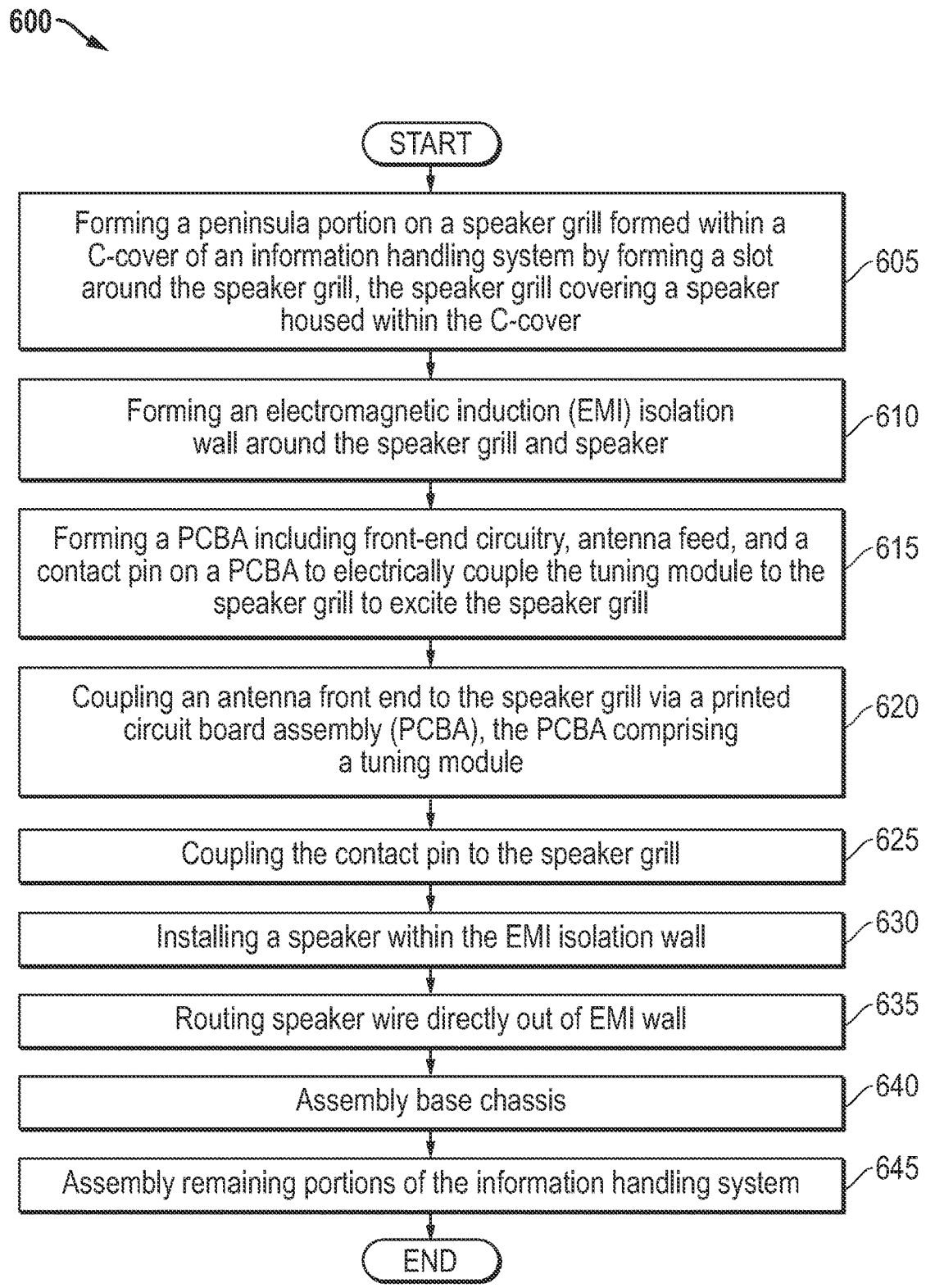
FIG. 6 is a flow diagram illustrating a method of assembling an information handling system according to an embodiment of the present disclosure.

FIG. 6 is a flow diagram illustrating a method 600 of assembling an information handling system according to an embodiment of the present disclosure. The method 600 may include, at block 605, forming a peninsula portion on a speaker grill formed within a C-cover of an information handling system by forming a slot around the speaker grill. As described herein the peninsula is formed by cutting or otherwise removing a portion of the C-cover along a portion of the perimeter of the speaker grill. This removal of the portion of the C-cover forms a slot between the portion of the speaker grill and the C-cover to establish a speaker grill platform antenna. According to an embodiment, a specific gap distance is created between the peninsula portion and the C-cover. This gap distance or slot width, in an embodiment, may be 1.5 mm. In an embodiment, the length of the slot formed along a portion of the perimeter of the speaker grill may be such that one or more target frequencies are emitted from the speaker grill platform antenna during operation of the antenna system may be realized. In an embodiment, the length of the slot may be 40 mm. In another embodiment, the length of the slot may be 70 mm. In an embodiment where the length of the slot is 70 mm around the perimeter of the speaker grill, regardless of any dielectric loading of the speaker grill, the RF EM waves emitted by the excitation of the speaker grill may be 2 GHz in a spectrum mapping with certain RF LTE bands such as band 1, band 2, band 4, band 66, band 25, band 34, and band 39. In an embodiment where the length of the slot is 40 mm around the perimeter of the speaker grill, regardless of any dielectric loading of the speaker grill, the speaker grill may resonate at 5 GHz with a spectrum mapping with certain RF LTE bands such as band 48, and a portion of a 5G new radio (5GNR) sub 6 band of n79.

The method 600 includes forming, at block 610, an electromagnetic induction (EMI) isolation wall around the speaker grill and speaker. As described herein, the EMI isolation wall may be formed on the C-cover and extend to the D-cover. In an embodiment, the EMI isolation wall may be formed on the D-cover and extend to the C-cover. In an embodiment, the formation of the EMI isolation wall creates a cavity formed behind the speaker grill.

The method 600 may further include, at block 615, forming a PCBA including front-end circuitry, antenna feed, and a contact pin on a PCBA to electrically couple the tuning module to the speaker grill to excite the speaker grill. The antenna feed in the PCBA may connect the integrated circuit mounts of the front-end circuitry to the contact pin in the PCBA. Further the front-end circuitry may be connected via data and power connectors and feeds to additional parts of the wireless adapter or additional processors and busses in the information handling system. As described herein, the front-end circuitry, and antenna feed, and a contact pin on a PCBA may be included within the EMI isolation wall and the cavity formed thereby. The front-end circuitry of the PCBA may connect through the EMI isolation wall to the remainder of the wireless adapter or busses to the processing of the information handling system as described. The inclusion of these elements within the EMI isolation wall creates the least amount of interference with the radiating speaker grill while still exciting the speaker grill of the speaker grill platform antenna described herein. The PCBA, during use, may receive an excitation signal from a co-axial cable entering the cavity at the location of the PCBA. The front-end module may then cause excitation currents to be passed to the contact pin via a short antenna feed line in the PCBA so as to excite the speaker grill of the speaker grill platform antenna. In an embodiment, the contact pin may be biased towards the speaker grill so that the contact pin maintains contact with the speaker grill 410.

The method 600, at block 620, may continue with coupling the antenna front end to the speaker grill via the PCBA, the PCBA comprising the tuning module. The PCBA may, in an embodiment, be coupled to the C-cover. The PCBA may be coupled to a point along the plastic trim ring formed into the slot and trench in order to limit the number of parasitic elements near the excited speaker grill 410 during operation of the speaker grill platform antenna.

The method 600 may include, at block 625, coupling the contact pin to the speaker grill. As described, the attachment of the PCBA biasing the contact pin and the contact pin spring structure may establish an electrical contact to the speaker grill platform. The contact pin may serve as the contact point between the front-end circuitry and the speaker grill such that a current and voltage may be selectively applied to the speaker grill of the speaker grill platform antenna.

The method 600, at block 630, includes installing a speaker within the EMI isolation wall. The speaker may be any device that may provide output to a user of the information handling system in the form of audio waves. At block 635, a speaker wire may be routed directly out of the EMI wall. The routing of the speaker wire outside of the EMI wall prevents any interference with the operation of the speaker grill platform antenna by preventing any noise produced by the speaker wire from affecting the transmitted RF EM waves from the speaker grill platform antenna.

The method 600, may include the assembly of the base chassis, at block 640. The assembly of the base chassis may include placing any number of components as described herein with respect to information handling systems, such as for FIG. 1, such as a keyboard, processor, memory, track pad, and disk drive, among others into the C-cover and coupling a D-cover to the C-cover. Assembly of the processors, memory, motherboard, graphics board, connectors, busses and the like may occur in the C-cover and D-cover assembly to form a base chasses according to techniques in the art. The C-cover and D-cover, thus assembled, form a base chassis of the information handling system. The method 600 of assembling the information handling system further includes, assembling any remaining portions of the information handling system, at block 645, such as the display chassis that includes the A-cover and B-cover assembly as described herein including connection of data and power connections to the display. In some embodiments, a variety of hinge elements may be used to operatively couple the base chassis and the display chassis to form an information handling system such as laptop computing system. At this point the method 600 may end.

The blocks of flow diagram of FIGS. 5 and 6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data comprising:
a base chassis including a metal bottom cover and a metal top cover, the metal top cover to house a speaker grill, the speaker grill covering a speaker box housing a speaker to emit audio waves;
a speaker grill platform antenna formed from a portion of the speaker grill to emit a target radio frequency (RF) by a slot formed through the top cover around the portion of the speaker grill to form a peninsula of the portion of the speaker grill;
the speaker grill platform antenna formed over a cavity of the speaker box under the speaker grill in the metal top cover;
a printed circuit board assembly (PCBA) comprising an antenna front end circuit operatively coupled to the speaker grill to excite the speaker grill to transmit RF data communications; and
a contact pin directly coupling an excitation signal to excite the speaker grill platform antenna.

2. The information handling system of claim 1, wherein the contact pin includes a spring element and the PCBA is fixed to the metal top cover of the base chassis to bias the contact pin against the speaker grill.

3. The information handling system of claim 1 further comprising:
a plastic trim ring molded into the slot, the plastic trim ring is used to physically secure the PCBA to the speaker grill.

4. The information handling system of claim 1 further comprising:
a coaxial cable communicatively coupling the antenna front end circuit to a tuning module through the walls of the cavity of the speaker box.

5. The information handling system of claim 1 further comprising:
a speaker wire communicatively coupling the speaker to a signal source wherein the speaker wire is routed out of the cavity of the speaker box and along an exterior side of the walls forming the cavity to reduce interference with the speaker grill platform antenna.

6. The information handling system of claim 1 further comprising:
the antenna front end circuit co-located with a tuning module within the cavity formed by the walls.

7. The information handling system of claim 1 further comprising:
a plastic trim ring molded into the slot such that the plastic trim ring, speaker grill platform antenna, and metal top cover form a flush surface.

8. The information handling system of claim 1 further comprising:
a trench formed into the speaker grill extending from the slot to receive a plastic trim ring around the speaker grill.

9. A base chassis assembly for an information handling system comprising:
a metal top cover to house a speaker grill, the speaker grill covering a speaker to emit audio waves;
the speaker grill formed within the metal top cover of the base chassis assembly to emit a target radio frequency (RF), including:
a slot formed around a portion of the speaker grill forming a peninsula on the speaker grill that is physically separated from the metal top cover of the base chassis assembly, where the peninsula serves as a speaker grill platform antenna;
a cavity formed behind the peninsula, the cavity including walls formed around the back side of the peninsula to electrically isolate the cavity between the metal top cover and a metal bottom cover of the base chassis assembly; and
a printed circuit board assembly (PCBA) secured inside the cavity behind the peninsula of the speaker grill platform antenna including an antenna front end circuit operatively coupled to the speaker grill platform antenna to excite the speaker grill platform antenna via a contact pin coupling an excitation signal with the antenna front end circuitry.

10. The assembly of claim 9, wherein the contact pin includes a spring element to bias the contact pin against the speaker grill.

11. The assembly of claim 9 further comprising:
a plastic trim ring molded into the slot to form a flush surface across the slot between the speaker grill and the metal top cover.

12. The assembly of claim 9 further comprising:
a coaxial cable communicatively coupling the antenna front end circuit to a tuning module through the walls of the cavity.

13. The assembly of claim 9 further comprising:
a speaker wire communicatively coupling the speaker to a signal source wherein the speaker wire is routed out of the cavity and along an exterior side of the walls forming the cavity.

14. The assembly of claim 9 further comprising:
the antenna front end circuit co-located with a tuning module within the cavity formed by the walls.

15. The assembly of claim 9 further comprising:
a plastic trim ring molded into the slot, wherein the PCBA is coupled to the plastic trim ring.

16. The assembly of claim 9 further comprising:
a trench formed into the metal top cover of the base chassis assembly, where the trench extends around the speaker grill to form an outer frame with the slot and the trench and slot to receive a plastic trim ring.

17. An information handling system to transmit a communication signal comprising:
a base chassis with a top metal cover and bottom metal cover, the top metal cover to house a speaker grill with a plurality of speaker grill apertures, the speaker grill covering a speaker to emit audio waves via the speaker grill apertures;
the speaker grill formed within the metal top cover to form a speaker grill platform antenna to emit a target radio frequency (RF) when an excitation current is applied to a portion of the speaker grill, including:
a slot formed around the portion of the speaker grill forming a peninsula on the speaker grill as the speaker grill platform antenna, where the slot physically separates the peninsula portion of the speaker grill from the metal top cover;
a cavity formed behind the speaker grill with an electromagnetic isolation (EMI) wall placed around the perimeter of the cavity and the metal bottom cover of the base chassis forming the bottom of the cavity, where the cavity further serves as a speaker cavity;
a printed circuit board assembly (PCBA) located within the cavity comprising:
an antenna front end;
a tuning module operatively coupled to the speaker grill platform antenna to, upon initiation of the antenna front end, excite the speaker grill platform antenna via a contact pin and dynamically switch frequencies based on the target frequency to be emitted by the speaker grill platform antenna; and a coaxial cable communicatively coupling the antenna front end to a processor.

18. The information handling system of claim 17, further comprising:

a plastic trim ring molded into the slot to physically secure the PCBA to the speaker grill inside the cavity.

19. The information handling system of claim 17, further comprising:

a speaker wire communicatively coupling the speaker to a signal source wherein the speaker wire is routed out of the cavity and along an exterior side of the EMI wall forming the cavity.

20. The information handling system of claim 17, further comprising:

a trench formed into the metal top cover and around the remainder of the speaker grill not formed as a peninsula by the slot and the trench and the slot to receive a plastic trim ring.

\* \* \* \* \*